US008282221B2

United States Patent
Arai et al.

(10) Patent No.: US 8,282,221 B2
(45) Date of Patent: Oct. 9, 2012

(54) PROJECTION APPARATUS USING VARIABLE LIGHT SOURCE

(75) Inventors: Kazuma Arai, Hachioji (JP); Fusao Ishii, Menlo Park, CA (US)

(73) Assignees: Silicon Quest Kabushiki Kaisha (JP); Olympus Corporation (JP)

( * ) Notice: Subject to any disclaimer, the term of this patent is extended or adjusted under 35 U.S.C. 154(b) by 1091 days.

(21) Appl. No.: 12/228,728

(22) Filed: Aug. 14, 2008

(65) Prior Publication Data

US 2009/0051712 A1 Feb. 26, 2009

Related U.S. Application Data

(63) Continuation-in-part of application No. 11/121,543, filed on May 4, 2005, now Pat. No. 7,268,932, which is a continuation-in-part of application No. 10/698,620, filed on Nov. 1, 2003, now abandoned, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(60) Provisional application No. 60/964,848, filed on Aug. 15, 2007.

(51) Int. Cl.
*G03B 21/14* (2006.01)
(52) U.S. Cl. ........................... 353/85; 348/743
(58) Field of Classification Search ............ 353/85, 353/121, 122; 348/742, 743, 771
See application file for complete search history.

(56) References Cited

U.S. PATENT DOCUMENTS

| | | | |
|---|---|---|---|
| 4,229,732 A | 10/1980 | Hartstein et al. | |
| 4,769,713 A | 9/1988 | Yasui | |
| 5,192,946 A | 3/1993 | Thompson et al. | |
| 5,214,420 A | 5/1993 | Thompson et al. | |
| 5,287,096 A | 2/1994 | Thompson et al. | |
| 5,448,314 A | 9/1995 | Heimbuch et al. | |
| 5,589,852 A | 12/1996 | Thompson et al. | |
| 5,617,243 A | 4/1997 | Yamazaki et al. | |
| 5,619,228 A * | 4/1997 | Doherty | 345/693 |
| 5,668,611 A | 9/1997 | Ernstoff et al. | |
| 5,767,828 A | 6/1998 | McKnight | |
| 5,917,558 A | 6/1999 | Stanton | |
| 5,986,640 A | 11/1999 | Baldwin et al. | |
| 6,232,963 B1 | 5/2001 | Tew et al. | |
| 6,573,951 B1 * | 6/2003 | Hewlett et al. | 348/770 |
| 6,663,243 B2 * | 12/2003 | Fielding et al. | 353/31 |
| 6,975,366 B2 | 12/2005 | Flint | |
| 7,154,458 B2 | 12/2006 | Nakanishi | |
| 7,232,224 B2 | 6/2007 | Penn | |
| 7,384,150 B2 * | 6/2008 | Prince | 353/31 |
| 7,954,961 B2 * | 6/2011 | Deppe et al. | 353/85 |
| 2005/0001932 A1 | 1/2005 | Masuda et al. | |
| 2006/0082562 A1 | 4/2006 | Childers et al. | |
| 2006/0279710 A1 * | 12/2006 | Tani | 353/85 |
| 2006/0285136 A1 | 12/2006 | Shin et al. | |
| 2007/0200806 A1 * | 8/2007 | Vestal et al. | 345/85 |

* cited by examiner

*Primary Examiner* — William C Dowling
(74) *Attorney, Agent, or Firm* — Bo-In Lin

(57) ABSTRACT

A projection apparatus using a spatial light modulator (SLM), comprising the following: at least one variable light source, at least one spatial light modulator for modulating the illumination light emitted from the variable light source in accordance with the modulation state of arrayed pixel elements, a variable light source controller for controlling modulation of the variable light source, and a spatial light modulator controller for controlling modulation of each pixel element of the spatial light modulator, wherein the variable light source controller controls the variable light source so as to reduce the period in which the modulation states of the pixel element are in transition on a display image.

19 Claims, 31 Drawing Sheets

$t_D + t_r < tLSB$
$t_D + t_f < tLSB$

PROJECTION APPARATUS USING VARIABLE LIGHT SOURCE

CROSS REFERENCE TO RELATED APPLICATIONS

This is a Non-provisional application of a U.S. Patent Provisional Application No. 60/964,848 filed on Aug. 15, 2007. The Patent Application 60/964,848 is a Continuation In Part (CIP) Application of a pending U.S. patent application Ser. No. 11/121,543 filed on May 4, 2005 issued into U.S. Pat. No. 7,268,932. The application Ser. No. 11/121,543 is a Continuation In Part (CIP) Application of three previously filed Applications. These three Applications are 10/698,620 filed on Nov. 1, 2003, now abandoned, 10/699,140 filed on Nov. 1, 2003 now issued into U.S. Pat. No. 6,862,127, and 10/699,143 filed on Nov. 1, 2003 now issued into U.S. Pat. No. 6,903,860 by the Applicant of this Patent Applications. The disclosures made in these Patent Applications are hereby incorporated by reference in this Patent Application.

BACKGROUND OF THE INVENTION

1. Field of the Invention

The present invention relates to a technique applicable to a projection apparatus comprising a spatial light modulator, or other apparatuses.

2. Description of the Related Art

After the dominance of CRT technology in the display industry for over 100 years, Flat Panel Displays (hereafter FPD) and Projection Displays have gained popularity because the FDP display implements a more compact image projecting system while projecting images on a larger display screen. Of several types of projection displays, projection displays using micro-displays are gaining recognition among the consumers because of their high picture quality and a lower cost than FPDs. There are two types of micro-displays used for projection displays on the market, i.e., micro-LCDs (Liquid Crystal Displays) and micromirror technology. Because the micromirror devices display images with an unpolarized light, the images projected by the micromirror device have a brightness superior to that of micro-LCDs, which use polarized light.

Even though there have been significant advances made in recent years in the technologies of implementing electromechanical micromirror devices as spatial light modulators (SLM), there are still limitations and difficulties when they are employed to display high quality images. Specifically, when the display images are digitally controlled, the quality of the images is adversely affected because the images are not displayed with a sufficient number of gray scale gradations.

Electromechanical micromirror devices have drawn considerable interest because of their application as spatial light modulators (SLMs). A spatial light modulator requires an array of a relatively large number of micromirror devices. In general, the number of devices required ranges from 60,000 to several million for each SLM. Referring to FIG. 1A for a digital video system 1 includes a display screen 2 disclosed in a relevant U.S. Pat. No. 5,214,420. A light source 10 is used to generate light beams to project illumination for the display images on the display screen 2. The light 9 projected from the light source is further concentrated and directed toward lens 12 by way of mirror 11. Lenses 12, 13 and 14 form a beam columnator operative to columnate the light 9 into a column of light 8. A spatial light modulator 15 is controlled by a computer through data transmitted over data cable 18 to selectively redirect a portion of the light from path 7 toward lens 5 to display on screen 2. FIG. 1B shows a SLM 15 that has a surface 16 that includes an array of switchable reflective elements 17, 27, 37, and 47, each of these reflective elements is attached to a hinge 30. When the element 17 is in an ON position, a portion of the light from path 7 is reflected and redirected along path 6 to lens 5 where it is enlarged or spread along path 4 to impinge on the display screen 2 to form an illuminated pixel 3. When the element 17 is in an OFF position, the light is reflected away from the display screen 2 and, hence, pixel 3 is dark.

The on-and-off states of the micromirror control scheme as that implemented in the U.S. Pat. No. 5,214,420, and in most conventional display systems, imposes a limitation on the quality of the display. Specifically, applying the conventional configuration of a control circuit limits the gray scale gradations produced in a conventional system (PWM between ON and OFF states) limited by the LSB (least significant bit, or the least pulse width). Due to the ON-OFF states implemented in the conventional systems, there is no way of providing a shorter pulse width than the duration represented by the LSB. The least quantity of light, which determines the gray scale, is the light reflected during the least pulse width. The limited levels of the gray scale lead to a degradation of the display image.

Specifically, FIG. 1C exemplifies, as related disclosures, a circuit diagram for controlling a micromirror according to U.S. Pat. No. 5,285,407. The control circuit includes memory cell 32. Various transistors are referred to as "M*" where "*" designates a transistor number and each transistor is an insulated gate field effect transistor. Transistors M5, and M7 are p-channel transistors; transistors, M6, M8, and M9 are n-channel transistors. The capacitances, C1 and C2, represent the capacitive loads in the memory cell 32. The memory cell 32 includes an access switch transistor M9 and a latch 32a based on a Static Random Access switch Memory (SRAM) design. All access transistors M9 on an Row line receive a DATA signal from a different Bit-line 31a. The particular memory cell 32 is accessed for writing a bit to the cell by turning on the appropriate row select transistor M9, using the ROW signal functioning as a Word-line. Latch 32a consists of two cross-coupled inverters, M5/M6 and M7/M8, which permit two stable states, that include a state 1 when is Node A high and Node B low, and a state 2 when Node A is low and Node B is high.

Switching between the dual states, as illustrated by the control circuit, to position the micromirrors in an ON or an OFF angular orientation as shown in FIG. 1A. The brightness, i.e., the gray scales of a digitally controlled image system is determined by the length of time the micromirror stays in an ON position. The length of time a micromirror is in an ON position is controlled by a multiple bit word. As a simple illustration, FIG. 1D shows the "binary time intervals" when controlling micromirrors with a four-bit word. As shown in FIG. 1D, the time durations have relative values of 1, 2, 4, 8, which in turn define the relative brightness for each of the four bits where "1" is the least significant bit and "8" is the most significant bit. According to the control mechanism as shown, the minimum controllable differences between gray scales for showing different levels of brightness is a represented by the "least significant bit" that maintains the micromirror at an ON position.

For example, assuming n bits of gray scales, one time frame is divided into $2^n-1$ equal time periods. For a 16.7-millisecond frame period and n-bit intensity values, the time period is $16.7/(2^n-1)$ milliseconds Having established these times for each pixel of each frame, pixel intensities are quantified such that black is a 0 time period, the intensity level represented by the LSB is 1 time period, and the maximum brightness is $2^n-1$ time periods. Each pixel's quantified intensity determines its ON-time during a time frame. Thus, during a time frame, each pixel with a quantified value of more than 0 is ON for the number of time periods that correspond to its intensity. The viewer's eye integrates the pixel brightness so that the image appears the same as if it were generated with analogous levels of light.

For controlling deflectable mirror devices, the PWM applies data to be formatted into "bit-planes", with each bit-plane corresponding to a bit weight of the quantity of light. Thus, if the brightness of each pixel is represented by an n-bit value, each frame of data has n bit-planes. Then, each bit-plane has a 0 or 1 value for each display element. According to the PWM control scheme as described in the preceding paragraphs, each bit-plane is separately loaded and the display elements are controlled on the basis of bit-plane values corresponding to the value of each bit within one frame. Specifically, the bit-plane according to the LSB of each pixel is displayed for 1 time period.

Additionally, a projection apparatus as described above generally uses a light source, such as a high pressure mercury lamp or a xenon lamp, which is difficult to turn on or off at a high speed.

Meanwhile, there is great demand for projection apparatuses to produce improved display (i.e. projection) image gradation. To meet this demand, an improvement in the gradation of a projection image in a projection apparatus is accomplished by controlling a spatial light modulator. There is, however, already a limitation in the achievable gradation with the control of the aforementioned spatial light modulator.

Additionally, the structure and control of the spatial light modulator can become unnecessarily complicated if a high level of gradation is attempted only by controlling the spatial light modulator.

Furthermore, the popularization of video resources such as a high definition (HD) video image or similar display systems has increased demand for projection apparatus with greater display resolution at a lower cost. Yet the use of conventional light sources such as the above described high pressure mercury lamp or xenon lamp that has no direct control over the emission light, makes it difficult to achieve a more compact spatial light modulator due to a problem known as "etendue," which greatly reduces the efficient usage of light. Therefore, the application of conventional light sources to achieve an improvement in gradation while using a more compact spatial light modulator is confronted with substantial technical difficulty.

SUMMARY OF THE INVENTION

In consideration of the above-described problem, one aspect of the present invention is to provide a technique to achieve a display gradation higher than the display gradation of a spatial light modulator in a projection apparatus comprising a spatial light modulator.

Another aspect of the present invention is to provide a technique that makes it possible to attain a display gradation precision higher than the display gradation precision of a spatial light modulator in a projection apparatus comprising a spatial light modulator.

Another aspect of the present invention is to provide a technique that makes it possible to attain a display gradation/ display gradation precision higher than the display gradation of a spatial light modulator without unnecessarily complicating the control and structure of the spatial light modulator in a projection apparatus comprising the spatial light modulator.

Another aspect of the present invention is to provide a technique that makes it possible to achieve both a more compact spatial light modulator and higher display gradation/ display gradation precision in a projection apparatus.

According to one exemplary embodiment of the present invention discloses a projection apparatus implementing a spatial light modulator (SLM), comprises: at least one variable light source; at least one spatial light modulator for modulating the illumination light emitted from the variable light source in accordance with the modulation state of arrayed pixel elements; a variable light source controller for controlling modulation of the variable light source; and a spatial light modulator controller for controlling modulation of each pixel element of the spatial light modulator, wherein the variable light source controller controls the variable light source so as to reduce an influence of a period, in which the modulation states of the pixel element are in transition, on a display image.

Another exemplary embodiment of the present invention discloses a projection apparatus implementing a spatial light modulator (SLM), comprises: at least one variable light source; at least one spatial light modulator for modulating the illumination light emitted from the variable light source in accordance with the modulation state of arrayed pixel elements; a variable light source controller for controlling modulation of the variable light source; and a spatial light modulator controller for controlling modulation of each pixel element of the spatial light modulator, wherein the variable light source controller changes the emission states of the variable light source during a modulation control period in which at least two of the pixel elements of the spatial light modulators correspond to the same grayscale bit and the two pixel elements also maintain a desired modulation state.

Another exemplary embodiment of the present invention discloses a projection apparatus implementing a micromirror device, comprises the following: at least one variable light source; at least one micromirror device for modulating the illumination light emitted from the variable light source in accordance with the deflection state of arrayed micromirror elements; a variable light source controller, which is capable of controlling pulse emission in a pulse width no greater than the period in which the modulation states of the pixel element are in transition, for controlling the variable light source; and a micromirror controller for controlling the deflection state of each micromirror element of the micromirror device, wherein the micromirror element comprises the following: an ON state for deflecting almost the entirety of an illumination light emitted from the variable light source toward a projection optical system, and an OFF state for deflecting the illumination light away from the projection optical system, and an intermediate state for deflecting a portion of the illumination light toward the projection optical system.

BRIEF DESCRIPTION OF DRAWINGS

The present invention is described in detail below with reference to the following Figures.

DESCRIPTION OF THE PREFERRED EMBODIMENTS

A description of the mirror device, as the premise upon which the embodiment of the present invention is based, follows. Thereafter, a description of a preferred embodiment of the present invention is presented.

Projection apparatuses using a spatial light modulator, such as a transmissive liquid crystal, a reflective liquid crystal, a mirror array, etc., are widely known.

A spatial light modulator includes a two-dimensional array that arranges, enlarges, and then displays on a screen by way of a projection lens arrayed as tens of thousands to millions of miniature modulation elements for projecting individual pixels corresponding to an image.

The spatial light modulators generally used for projection apparatuses are of primarily two types: 1) a liquid crystal device for modulating the polarizing direction of incident light; a liquid crystal is sealed between transparent substrates and provides them with a potential, and 2) a mirror device that deflects miniature micro electro mechanical systems (MEMS) mirrors with electrostatic force and controls the direction of reflected illumination light.

One embodiment of the above described mirror device is disclosed in U.S. Pat. No. 4,229,732, in which a drive circuit using MOSFET and deflectable metallic mirrors are set on a semiconductor wafer substrate. The mirror can be deformed by electrostatic force supplied from the drive circuit and is capable of changing the direction of reflected incident light.

Meanwhile, U.S. Pat. No. 4,662,746 has disclosed an embodiment in which one or two elastic hinges retain a mirror. If the mirror is retained by one elastic hinge, the elastic hinge functions as bending spring. If two elastic hinges retain the mirror, these two elastic hinges function as torsion springs to incline the mirror and thereby deflect the direction of reflected incident light.

Further, as described above, the ON-and-OFF state of a micromirror control scheme as implemented in U.S. Pat. No. 5,214,420, and in most conventional display systems, imposes a limitation on the quality of display. This is because in a conventionally configured control circuit, the gray scale of conventional system (PWM between ON and OFF states) is limited by the LSB (least significant bit, or the least pulse width). Due to the ON-OFF states implemented in conventional systems, it is impossible to provide a shorter pulse width than the LSB. The least brightness, which determines gray scale, is the light reflected during the least pulse width. A limited number of gray scales lead to a degradation in the displayed image quality.

Figure 1A:
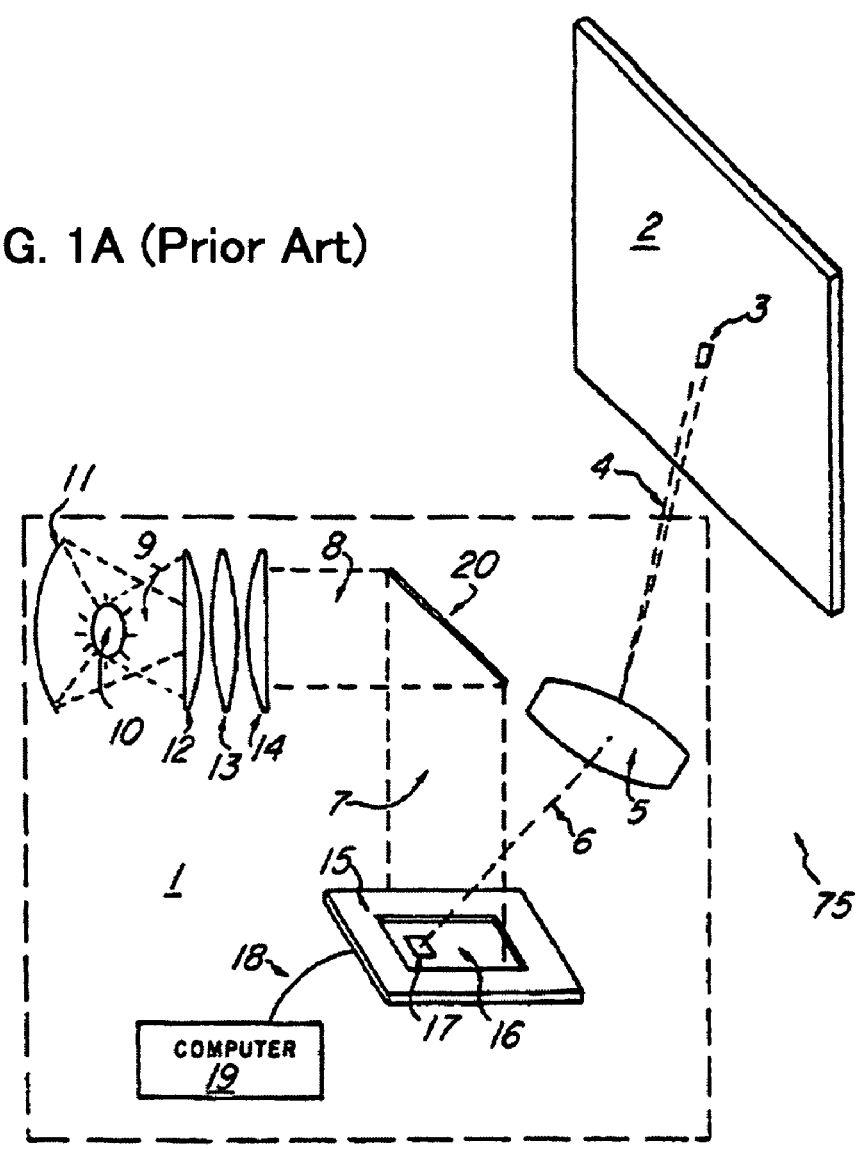
FIG. 1A is a functional block diagram showing the configuration of a projection apparatus according to a conventional technique.
Figure 1B:
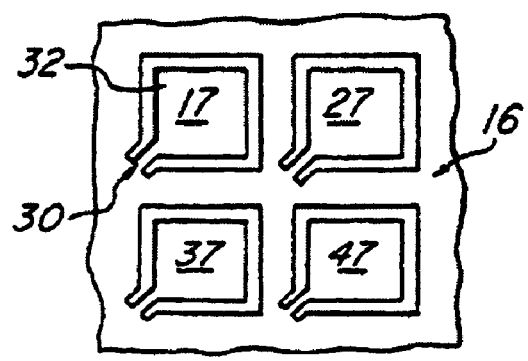
FIG. 1B is a top view for showing the configuration of a mirror element of a projection apparatus according to a conventional technique.
Figure 1C:
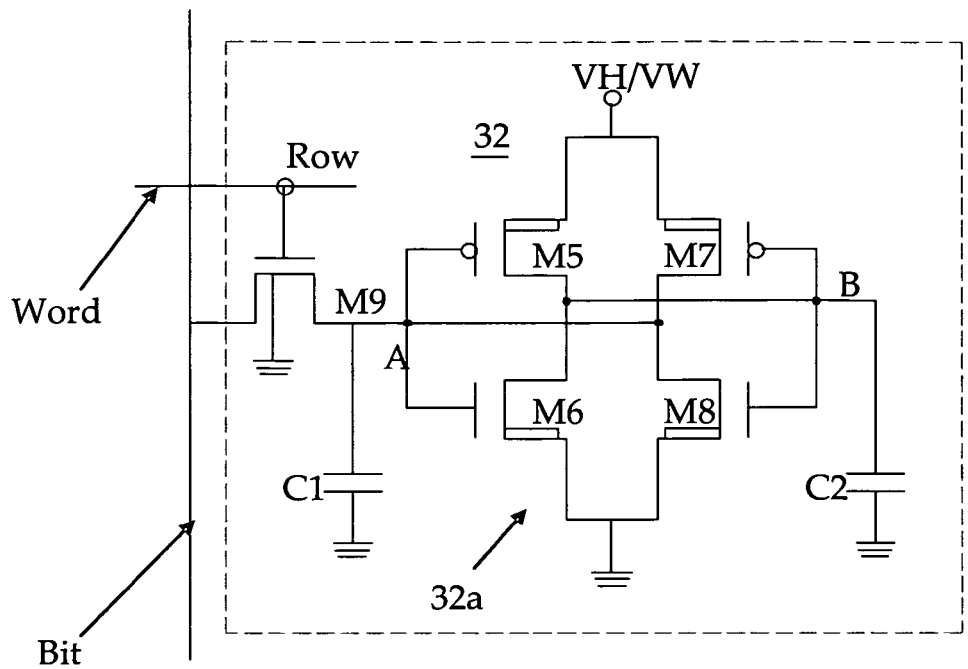
FIG. 1C is a circuit diagram for showing the circuit configuration of the drive circuit of a mirror element of a projection apparatus according to a conventional technique.

Specifically, FIG. 1C shows a circuit diagram of a related art control circuit for a micromirror according to U.S. Pat. No. 5,285,407. The control circuit includes memory cell 32. Various transistors are referred to as "M*", where "*" denotes a transistor number, and each transistor is an insulated gate field effect transistor. Transistors M5 and M7 are p-channel transistors; transistors M6, M8, and M9 are n-channel transistors. The capacitances, C1 and C2, represent the capacitive loads available to memory cell 32. Memory cell 32 includes an access switch transistor M9 and a latch 32*a*, which is the basis of the Static Random Access switch Memory (SRAM) design. The transistor M9 in a Row-line receives a data signal via a Bit-line 31*a*. The memory cell 32 stores data and is accessed when the transistor M9 receives a ROW signal on a Word-line. Latch 32*a* consists of two cross-coupled inverters, M5/M6 and M7/M8, which permit two stable states: state 1 when Node A is high and Node B is low and state 2 when Node A is low and Node B is high.

The mirror, driven by a drive electrode, abuts a landing electrode structured differently from the drive electrode, and thereby a prescribed tilt angle is maintained. An elastic "landing chip" is set on the contact part abutting the landing electrode so that the mirror deflects in the opposite direction when voltage to applied to the electrode is switched. The landing chip and the landing electrode maintain the same potential in order to prevent short circuit damages upon contact.

Figure 1D:
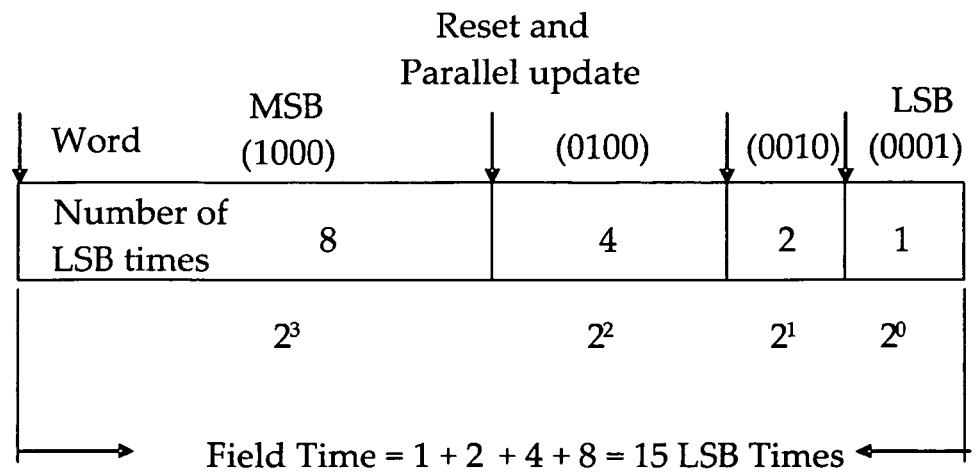
FIG. 1D is a timing diagram for showing the mirror control time schemes according to the image data format used in a projection apparatus according to a conventional technique.

Here follows a description of a pulse-width modulation (PWM) control. As described above, the control circuit positions the micromirrors in either an ON or OFF angular orientation (as shown in FIG. 1A). The brightness, i.e., the level of gray scales, of a display for a digitally controlled image system is determined by the length of time the micromirror stays at an ON position. The length of time a micromirror stays at an ON position is in turn controlled by a multiple bit word. As a simple illustration, FIG. 1D shows the "binary time intervals" with control by a four-bit word. As shown in FIG. 1D, time durations have relative values of 1, 2, 4, 8 that in turn define the relative brightness for each of the four bits where "1" is the least significant bit and "8" is the most significant bit. The minimum difference between gray scales for indicating different light intensities is limited by the "least significant bit" that maintains the micromirror at an ON position.

For example, assuming an n-bit gray scale, the time frame is divided into $(2^{n}-1)$ equal time periods. For a 16.7-millisecond time frame and n-bit intensity values, the time period is $16.7/(2^{n}-1)$ milliseconds Having established these times, for each pixel of each frame, pixel intensities are quantified, such that black is "0" time period, the intensity level represented by the LSB is "1" time period, and maximum brightness is "15" time periods (in the case of n=4). The quantified intensity of each pixel determines its ON-time during a time frame. Thus, during a time frame, each pixel with a quantified value of more than "0" is ON for the number of time periods that correspond to its intensity. The viewer's eye integrates the pixel brightness so that the image appears as if it were generated with analog levels of light.

To address this limitation in mirror devices, a pulse width control (PWM) scheme calls for data formatted into "bit-planes", each bit-plane corresponding to the bit weight of the intensity value. Thus, if the intensity of each pixel is represented by an n-bit value, each frame of data has n bit-planes. Each bit-plane has "0" or "1" value for each display element. In the PWM example described in the preceding paragraphs, during a frame, each bit-plane is separately loaded and the display elements are addressed in accordance with their associated bit-plane values. For example, the bit-plane representing the LSB of each pixel is displayed for 1 time period.

Here follows a description of the size of the mirrors and the resolution. The size of the mirrors of such a mirror device is between 4 μm and 10 μm for each side. The mirrors are placed on a semiconductor wafer substrate in such a manner as to minimize the gap between adjacent mirrors so that excess reflected light from the gap does not degrade the contrast of a modulated image. The mirror device comprises the appropriate number of mirror elements as image display elements. The appropriate number of image display elements would be determined in compliance with the display resolution specified by the Video Electronics Standards Association (VESA) and the television forecasting standard. In the case of a mirror device comprising the number of mirror elements compliant to the WXGA (with the resolution of 1280×768) specified by the VESA, and in which mirrors are arrayed in intervals (noted as "pitch" hereinafter) of 10 μm, a sufficiently miniature mirror device is configured with about 15.49 mm (0.61 inches) as the diagonal length of the display area.

Figure 2:
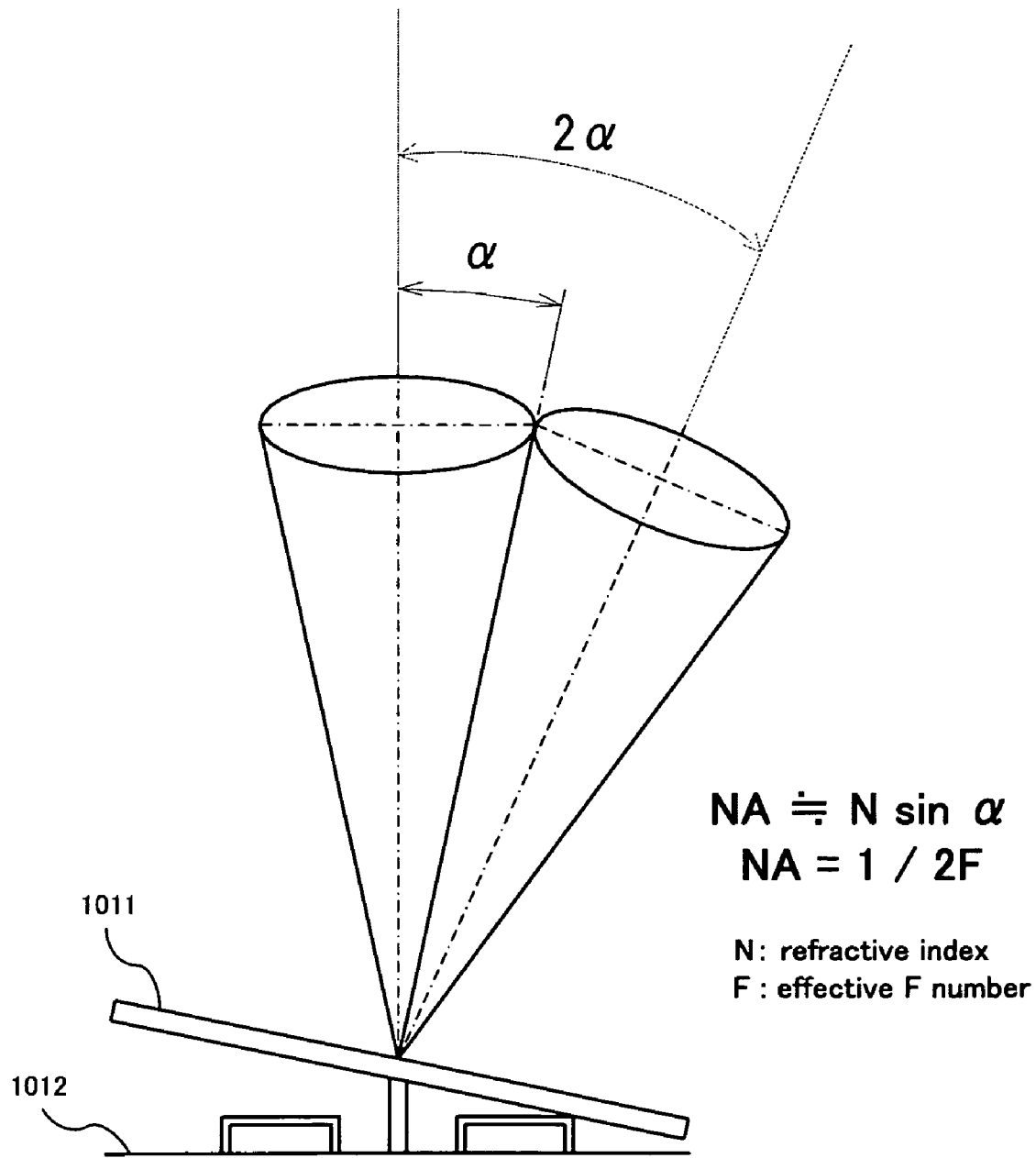
FIG. 2 is a cross sectional view for showing the relationship between the numerical aperture NA1 of an illumination light path, the numerical aperture NA2 of a projection light path, and the tilt angle α of a mirror.

Here follows an introductory description of the laser light source. In the projection apparatus comprising the reflective spatial light modulator of the above described mirror, there is a close relationship between the numerical aperture (NA) NA1 of an illumination light path, the numerical aperture NA2 of a projection light path, and the tilt angle α of a mirror. FIG. 2 shows the relationship between them.

For the discussion of the exemplary embodiment, it is assumed that the tilt angle α of a mirror 1011 is 12 degrees. When a modulated light reflected by the mirror 1011 and incident to the pupil of the projection light path is set perpendicular to the device substrate 1012, the illumination light is incident from a direction inclined by 2α, that is, 24 degrees, relative to the perpendicular of the device substrate 1012. For the light beam reflected by the mirror to be most efficiently incident to the pupil of the projection lens, it is desirable that the numerical aperture of the projection light path be equal to the numerical aperture of the illumination light path. If the numerical aperture of the projection light path is smaller than that of the illumination light path, the illumination light cannot be sufficiently imported into the projection light path; if the numerical aperture of the projection light path is larger that that of the illumination light path, the illumination light can be entirely imported. In the latter case, the projection lens then becomes unnecessarily large, which makes configuring the projection apparatus inconvenient. Furthermore, the light fluxes of the illumination light and projection light must be separate because the optical members of the illumination system and those of the projection system must be kept separate. With the above considerations in mind, when a spatial light modulator with a mirror tilt angle of 12 degrees is used, the numerical aperture (NA) NA1 of the illumination light path and the numerical aperture NA2 of the projection light path are preferred to be set as follows:

$$NA1=NA2=\sin\alpha=\sin 12°$$

Let F1 be the aperture number of the illumination light path and F2 be the aperture number of the projection light path, then the numerical aperture can be converted into a product of F as follows:

$$F1=F2=1/(2*NA)=1/(2*\sin 12°)=2.4$$

In order to maximize the projection of the illumination light emitted from a light source possessing non-directivity in the direction of emitted light, such as a high-pressure mercury lamp or a xenon lamp such as are generally used in projection apparatuses, the angle of light projecting on the illumination light path side must be maximized. Since the numerical aperture of the illumination light path is determined by the tilt angle of a mirror, the tilt angle of the mirror needs to be large in order to increase the numerical aperture of the illumination light path.

Increasing of the tilt angle of mirror, however, requires a higher drive voltage and a larger distance between the mirror and the electrode in order to drive the mirror to allow space for the larger tilt angle. The electrostatic force F generated between the mirror and electrode is given by the following equation:

$$F=(\epsilon*S*V^2)/(2*d^2),$$

where "S" is the area of the electrode, "V" is the voltage, "d" is the distance between the electrode and mirror and "$\epsilon$" is the permittivity of vacuum.

The equation shows that the drive force is decreased in proportion to the second power of the distance d between the electrode and mirror. It is possible to increase the drive voltage to compensate for the decrease in the drive force due to an increase in distance. Conventionally, however, the drive voltage is about 5 to 10 volts in the drive circuit of a CMOS process used for driving a mirror and, therefore, a relatively special process, such as a DMOS process, is required if a drive voltage in excess of about 10 volts is needed. Including such a process runs counter to the demand for cost reduction.

On the other hand, for the purposes of cost reduction, it is desirable to obtain as many mirror devices as possible from a single semiconductor wafer substrate, since this is would be an improvement of productivity. That is, a reduction of the pitch between mirror elements reduces the size of the mirror device. A decrease in mirror size results to a reduction in the area of the electrode, which, in turn, requires a lower driving power.

Figure 3:
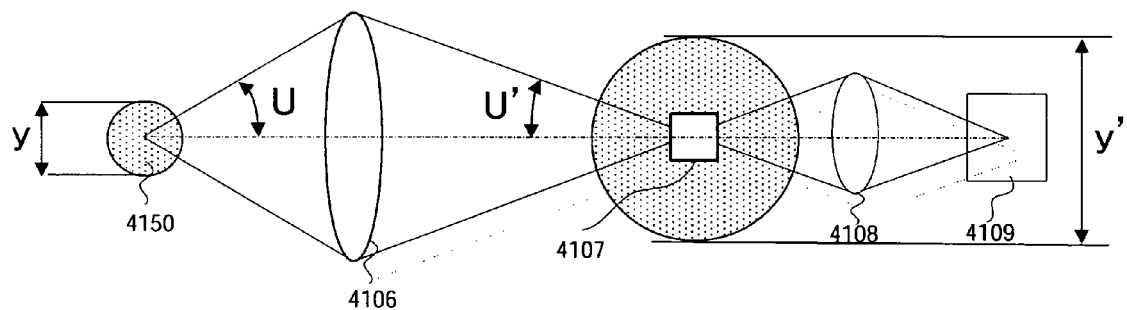
FIG. 3 is a diagram for illustrating the etendue in the case of using a discharge lamp light source and projecting an image by way of an optical device.

In contrast, a mirror device is able to produce brighter illumination only if a conventional lamp is used. Yet the usage of a conventional lamp with a non-directivity in its emission substantially reduces the efficiency of light usage. This is attributable to a relationship commonly called etendue. As shown in FIG. 3, where "y" is the size of a light source, "u" is the importing angle of light on the light source side, "y'" is the size of the image of a light source, and "u'" is the converging angle on the image side, the relationship among these is represented by the following equation:

$$y*u=y'*u'$$

This equation shows that the smaller the device on which a light source is intended to be imaged, the smaller the importing angle on the light source side becomes. This is why it is advantageous to use a laser light source, wherein emission light possesses strong directivity, in order to allow for a decrease in mirror device size. Note that in FIG. 3 the reference symbol 4107 is a device, 4108 is a projection lens, and 4109 is a projected image.

Here follows is a description of a resolution limit.

An examination of the limit value of the aperture ratio of a projection lens used for a projection apparatus, which displays the display surface of a spatial light modulator in enlargement, with respect to the resolution of an image to be projected, reveals the following.

Where "Rp" is the pixel pitch of the spatial light modulator, "NA" is the aperture ratio of a projection lens, "F" is an F number, and "$\lambda$" is the wavelength of light, the limit "Rp" with which any adjacent pixels on the projection surface are separately observed is given by the following expression:

$$Rp=0.61*\lambda/NA=1.22*\lambda*F$$

The table below shows the F value of a projection lens and the deflection angle of a mirror when the pitch of adjacent mirror elements is shortened by miniaturizing the mirror elements, where the light beam wavelength of $\lambda=650$ nm is the worst condition within the range of visible light. Meanwhile, the F value of a projection lens with a wavelength of 700 nm is about 7% smaller than that for a wavelength of 650 nm.

| Pixel pitch of mirror device [μm] | F number of projection lens | Deflection angle of mirror [degrees] |
| --- | --- | --- |
| 4 | 5.04 | 5.69 |
| 5 | 6.30 | 4.55 |
| 6 | 7.56 | 3.79 |
| 7 | 8.82 | 3.24 |
| 8 | 10.08 | 2.84 |
| 9 | 11.34 | 2.52 |
| 10 | 12.61 | 2.27 |
| 11 | 13.87 | 2.06 |

Therefore, if the problem related to the above-described etendue is avoided by using a laser light as the light source, the F numbers of lenses for the illumination system and projection system can be increased to the values shown in the table. This makes it possible to decrease the deflection angle of the mirror element and thereby a miniature mirror device with a low drive voltage can be configured.

Here follows a description of an oscillation control.

Another method for reducing the drive voltage, other than minimizing the mirror tilt angle, is disclosed in US Patent Application 20,050,190,429. According to this method, a mirror is put into free oscillation in the inherent oscillation frequency, and the intensity of light during the oscillation period of the mirror is thereby reduced to about 25% to 37% of the emission light intensity for a mirror that is controlled under a constant ON-state.

With this method there is no particular need to drive the mirror in high speed, making it possible to obtain a high level of gradation with a low spring constant in the spring member supporting the mirror, which allows for a reduction in drive voltage.

As described above, the adoption of a light source with directivity, such as a laser light source, makes it possible to reduce the deflection angle of a mirror and the size of the mirror device without decreasing the brightness of the light source. Furthermore, such a light source improves gradation without requiring an increase drive voltage if employed with the above described oscillation control.

With the above described mirror device as a premise kept in mind, a description of a first preferred embodiment of the present invention is here provided in detail.

The following is a detailed description of the preferred embodiment of the present invention with reference to the accompanying drawings. First is a description of a projection apparatus according to the present embodiment with reference to FIGS. 4, 5A, 5B and 5C.

Figure 4:
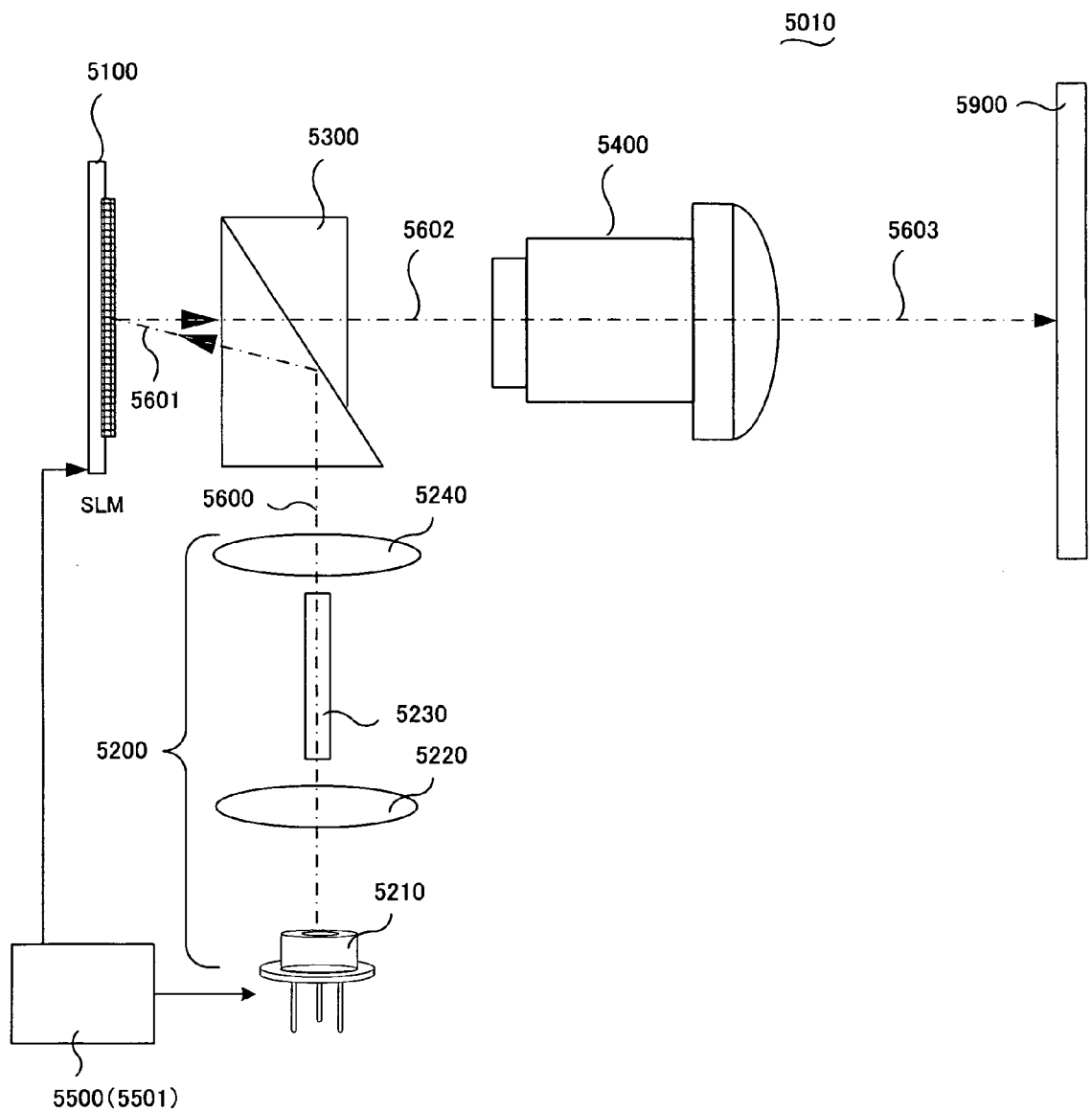
FIG. 4 is a functional block diagram for showing the configuration of a projection apparatus according to a preferred embodiment of the present invention.

FIG. 4 is a conceptual diagram showing the configuration of a projection apparatus according to a preferred embodiment of the present invention.

A projection apparatus 5010 according to the present embodiment comprises a single spatial light modulator (SLM) 5100, a control unit 5500, a Total Internal Reflection (TIR) prism 5300, a projection optical system 5400, and a light source optical system 5200 as illustrated in FIG. 4.

The projection apparatus 5010 is a so-called single-panel projection apparatus 5010 comprising a single spatial light modulator 5100.

The projection optical system 5400 is equipped with spatial light modulator 5100 and TIR prism 5300 in the optical axis of the projection optical system 5400, and the light source optical system 5200 is equipped in such that the optical axis thereof matches that of the projection optical system 5400.

The TIR prism 5300 makes an illumination light 5600, which comes from the light source optical system 5200 placed on the side enters the spatial light modulator 5100 at a prescribed inclination angle relative to incident light 5601, and makes a reflection light 5602 reflected by the spatial light modulator 5100 transmit so as to reach the projection optical system 5400.

The projection optical system 5400 projects the reflection light 5602 coming from the spatial light modulator 5100 and TIR prism 5300 onto a screen 5900 as projection light 5603.

The light source optical system 5200 comprises a variable light source 5210 for generating the illumination light 5600, a condenser lens 5220 for focusing the illumination light 5600, a rod type condenser body 5230, and a condenser lens 5240.

The variable light source 5210, condenser lens 5220, rod type condenser body 5230, and condenser lens 5240 are placed in the aforementioned order on the optical axis of the illumination light 5600, which is emitted from the variable light source 5210 and incident to the side face of the TIR prism 5300.

The projection apparatus 5010 employs a single spatial light modulator 5100 for implementing a color display on the screen 5900 by means of a sequential color display method. That is, the variable light source 5210, comprising a red laser light source 5211, a green laser light source 5212, and a blue laser light source 5213 which are not shown in FIG. 4, allows independent controls for light emission states, divides one frame of display data into sub-fields (i.e., three sub-fields, that is, red (R), green (G) and blue (B) in the present case), and causes the red laser light source 5211, the green laser light source 5212, and the blue laser light source 5213 each to emit their respective light during the time period corresponding to the sub-field of each color as described later.

Figure 5A:
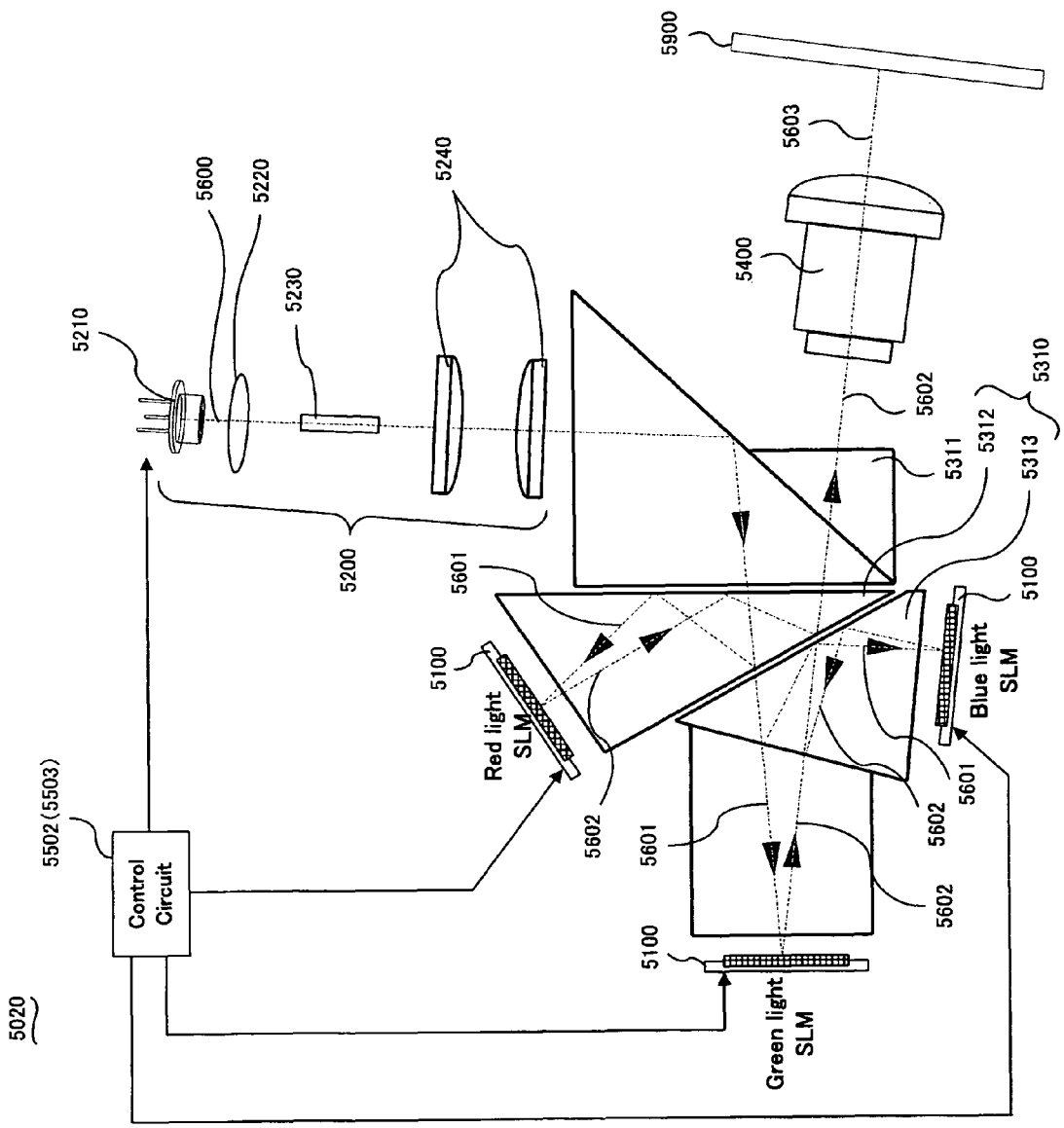
FIG. 5A is a functional block diagram for showing the configuration of a multi-panel projection apparatus according to another preferred embodiment of the present invention.

FIG. 5A is a diagram for showing a modification of the configuration of a projection apparatus according to the present embodiment.

The projection apparatus 5020 is generally referred to as a multiple-plate projection apparatus comprising spatial light modulators 5100, which different from the above described projection apparatus 5010. Furthermore, the projection apparatus 5020 comprises a control unit 5502 instead of the control unit 5500.

The projection apparatus 5020 comprises spatial light modulators 5100, and is equipped with a light separation/synthesis optical system 5310 disposed between the projection optical system 5400 and each of the spatial light modulators 5100.

The light separation/synthesis optical system 5310 comprises TIR prism 5311, prism 5312, and prism 5313.

The TIR prism 5311 has the function of directing the incident illumination light 5600 from the side of the optical axis of the projection optical system 5400 to the spatial light modulator 5100 as incident light 5601.

The prism 5312 carries out the functions 1) of separating red (R) light from incident light 5601 by way of the TIR prism 5311 and making the red light incident to the red light-use spatial light modulator 5100, and 2) directing the reflection light 5602 of the red light to the TIR prism 5311.

Likewise, the prism 5313 performs the functions of 1) separating blue (B) and green (G) lights from the incident light 5601 incident by way of the TIR prism 5311 and making them incident to the blue color-use spatial light modulators 5100 and green color-use spatial light modulators 5100, and 2) directing the reflection light 5602 of the green light and blue light to the TIR prism 5311.

Therefore, the spatial light modulations of the three colors R, G, and B are simultaneously performed by three spatial light modulators 5100, and the resultant reflection lights with respective modulations are projected onto the screen 5900 as the projection light 5603 by way of the projection optical system 5400, and thus a color display is achieved.

Note that various modifications are possible for a light separation/synthesis optical system such as light separation/synthesis optical system 5310.

Figure 5B:
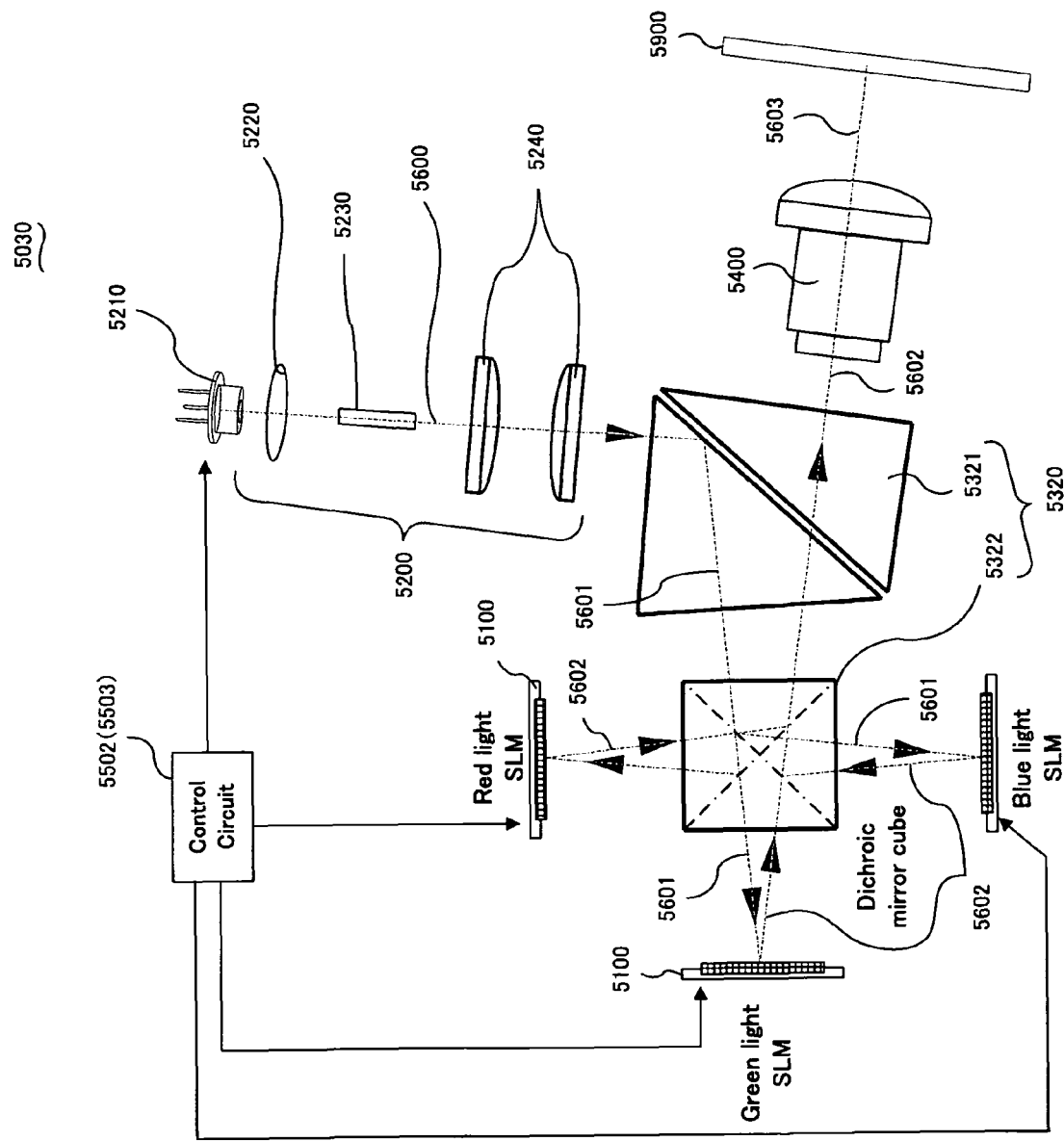
FIG. 5B is a side view for showing the configuration of a modification of a multi-panel projection apparatus according to a preferred embodiment of the present invention.

FIG. 5B is a block diagram showing an alternate configuration of a projection apparatus according to the present embodiment.

The projection apparatus comprises a light separation/synthesis optical system 5320 in place of the above described light separation/synthesis optical system 5310.

The light separation/synthesis optical system 5320 comprises a TIR prism 5321 and a cross dichroic mirror 5322.

The TIR prism 5321 directs an illumination light 5600 projecting from the lateral direction of the optical axis of the projection optical system 5400 to the spatial light modulators 5100 as incident light 5601.

The cross dichroic mirror 5322 1) separates red, blue, and green colors from the incident light 5601 from the TIR prism 5321, making the incident lights 5601 of the three colors enter respectively the red-use, blue-use, and green-use spatial light modulators 5100, and 2) converges the reflection lights 5602 reflected by the color-use spatial light modulators 5100 and directs it to the projection optical system 5400.

Figure 5C:
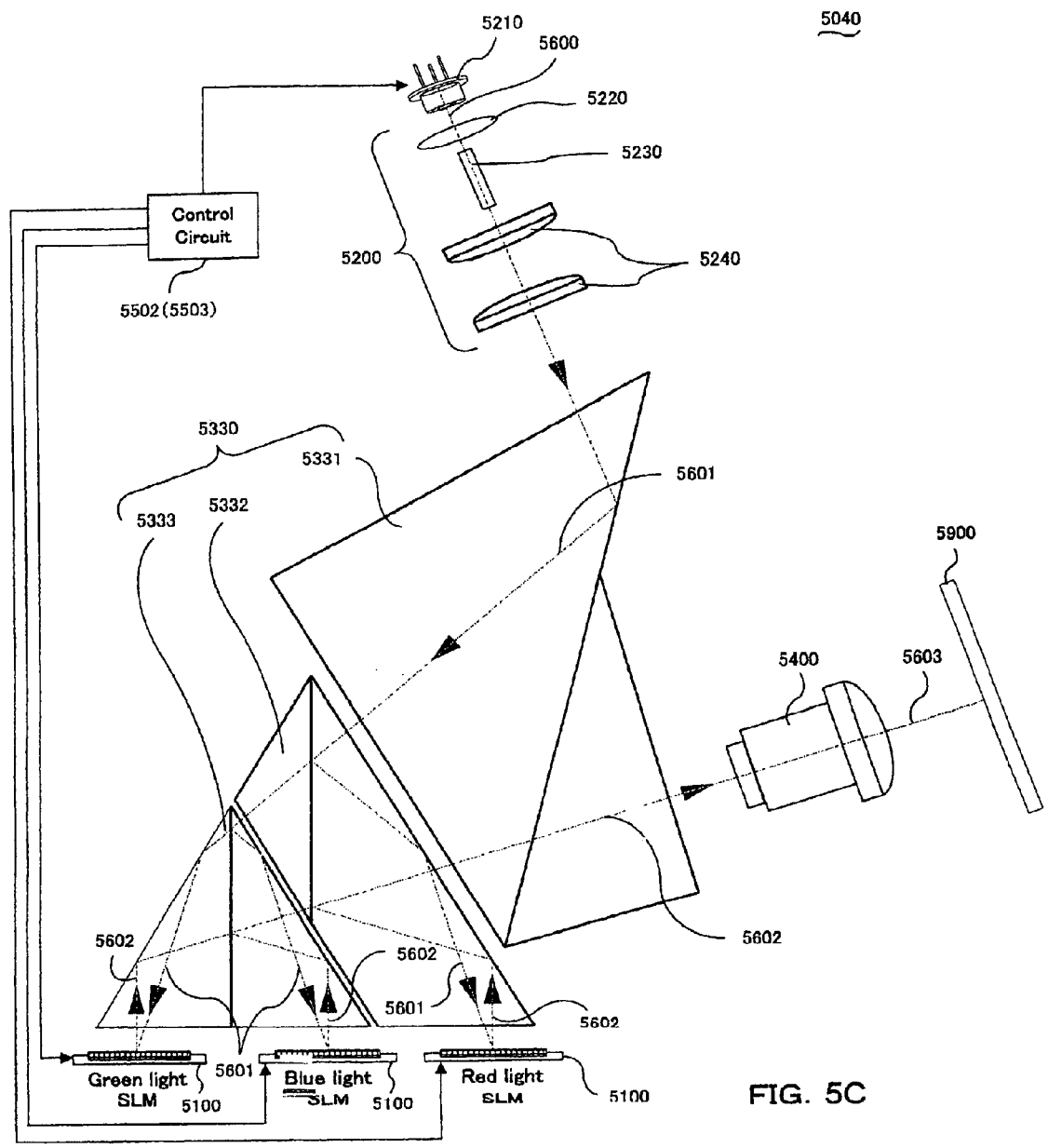
FIG. 5C is a side view for showing the configuration of another modification of a multi-panel projection apparatus according to a preferred embodiment of the present invention.

FIG. 5C is a side view for showing an alternate configuration of a projection apparatus of this invention.

The projection apparatus 5040 is configured differently from the above-described projection apparatuses 5020 and 5030, by placing the spatial light modulators 5100, which correspond to the three colors R, G, and B adjacent to one another in the same plane on one side of a light separation/synthesis optical system 5330.

This configuration saves space by consolidating the spatial light modulators 5100 into the same packaging unit.

The light separation/synthesis optical system 5330 comprises a TIR prism 5331, a TIR prism 5332, and a TIR prism 5333.

The TIR prism 5331 directs the illuminating light 5100 incident in the lateral direction of the optical axis of the projection optical system 5400 as incident light 5601 to spatial light modulators 5100.

The TIR prism 5332 1) separates red color light from the incident light 5601 and directs it to the red color-use spatial light modulator 5100, and 2) captures the reflection light 5602 and directs it to the projection optical system 5400.

Likewise, the TIR prism 5333 1) separates the incident lights of green and blue colors from the incident light 5601, making them incident to their corresponding spatial light modulators 5100, and 2) captures their respective reflection lights 5602 and directs them to the projection optical system 5400.

Here follows a description of the configuration of the control unit of a projection apparatus according to the present embodiment with reference to FIGS. 6A through 6D.

Figure 6A:
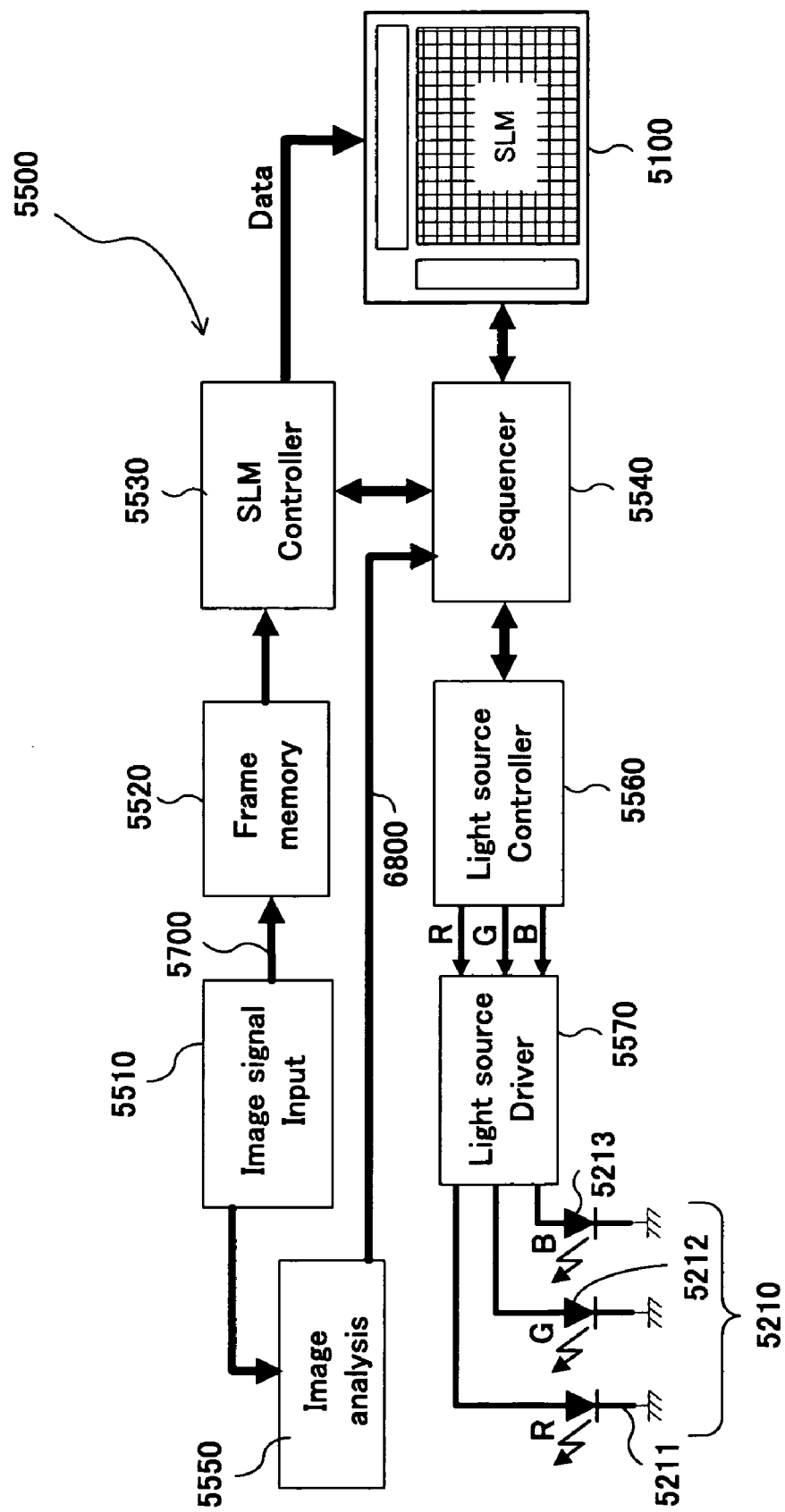
FIG. 6A is a block diagram for illustrating the configuration of a control unit comprising a single-panel projection apparatus according to a preferred embodiment of the present invention.

FIG. 6A is a block diagram for illustrating the configuration of the control unit 5500 comprised in the above described single-panel projection apparatus 5010. The control unit 5500 comprises a frame memory 5520, an SLM controller 5530, a sequencer 5540, a light source control unit 5560, and a light source drive circuit 5570.

The sequencer 5540, comprising a microprocessor that controls operation timing and the control unit 5500 and spatial light modulators 5100.

The frame memory 5520 retains one frame of digital video data input 5700 from an external device (not shown in FIG. 6A), which is connected to a video signal input unit 5510. The digital video data input 5700 is updated every time the display of one frame is completed.

The SLM controller 5530 processes the digital video data input 5700 read from the frame memory 5520 as described later, separates the read data into sub-fields 5701 through 5703, and outputs them to the spatial light modulators 5100 as binary data 5704 and non-binary data 5705, which are used for implementing the ON/OFF control and oscillation control (which are described later) of a mirror 5112 of the spatial light modulator 5100.

The sequencer 5540 outputs a timing signal to the spatial light modulators 5100 synchronously with the generation of the binary data 5704 and non-binary data 5705 at the SLM controller 5530.

The video image analysis unit 5550 outputs a video image analysis signal 5800 used for generating various light source patterns (which are described later) on the basis of the digital video data 5700 received from the video signal input unit 5510.

In this event, the video image analysis unit 5550 calculates the average picture level of each frame or of a predetermined frame from the digital video data input 5700 from the video signal input unit 5510, and outputs a video image analysis signal 6800 to the sequencer 5540. Furthermore, the video image analysis unit 5550, which calculates, as a video image analysis signal 6800, the average luminance level and the maximum luminance level of the digital video data input 5700 from the video signal input unit 5510, enables a similar control, making it possible to attain the optimal gray scale display on the basis of the digital video data 5700.

The light source control unit 5560 controls the operation of the variable light source 5210 by using a light source profile control signal to control the light source drive circuit 5570 for emitting the illumination light 5600. This light source profile control signal is generated from the video image analysis signal 6800 on the basis of the input of the video image analysis signal 6800 obtained from the video image analysis unit 5550 by way of the sequencer 5540 and generates light source pulse patterns 5801 through 5815 (which are described later).

The light source drive circuit 5570 drives red laser light source 5211, green laser light source 5212, and blue laser light source 5213 of the variable light source 5210 to emit light so as to generate the light source pulse patterns 5801 through 5815 (which are described later), which are input from the light source control unit 5560.

Figure 6B:
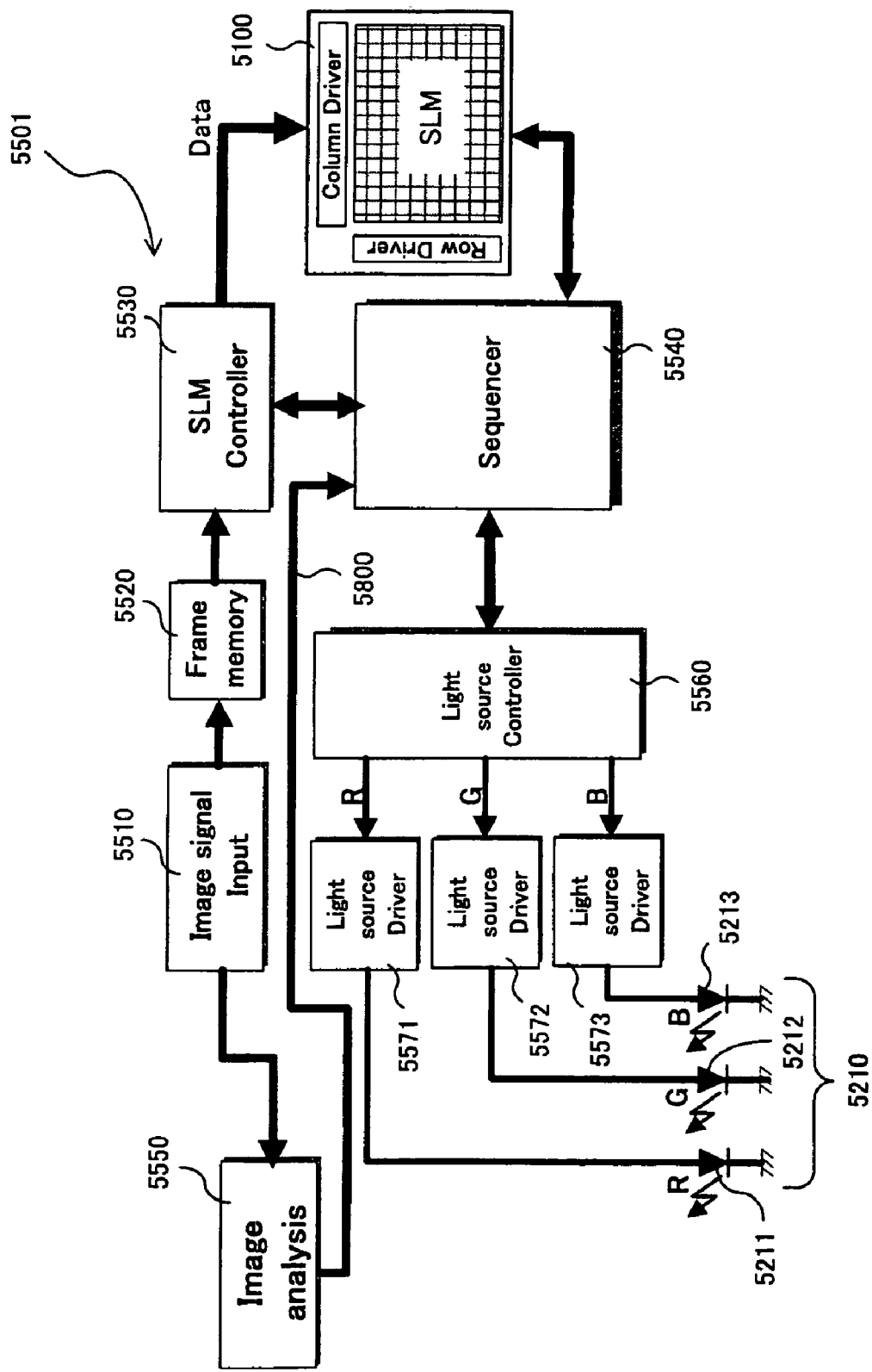
FIG. 6B is a block diagram for illustrating the configuration of a control unit used for a single-panel projection apparatus according to a preferred embodiment of the present invention.

FIG. 6B is a conceptual diagram illustrating the configuration of a control unit used for a single-panel projection apparatus according to the present embodiment. A control unit 5501 is equipped with a light source drive circuit 5571, a light source drive circuit 5572, and a light source drive circuit 5573, which correspond to red laser light source 5211, green laser light source 5212, and blue laser light source 5213, respectively.

Figure 6C:
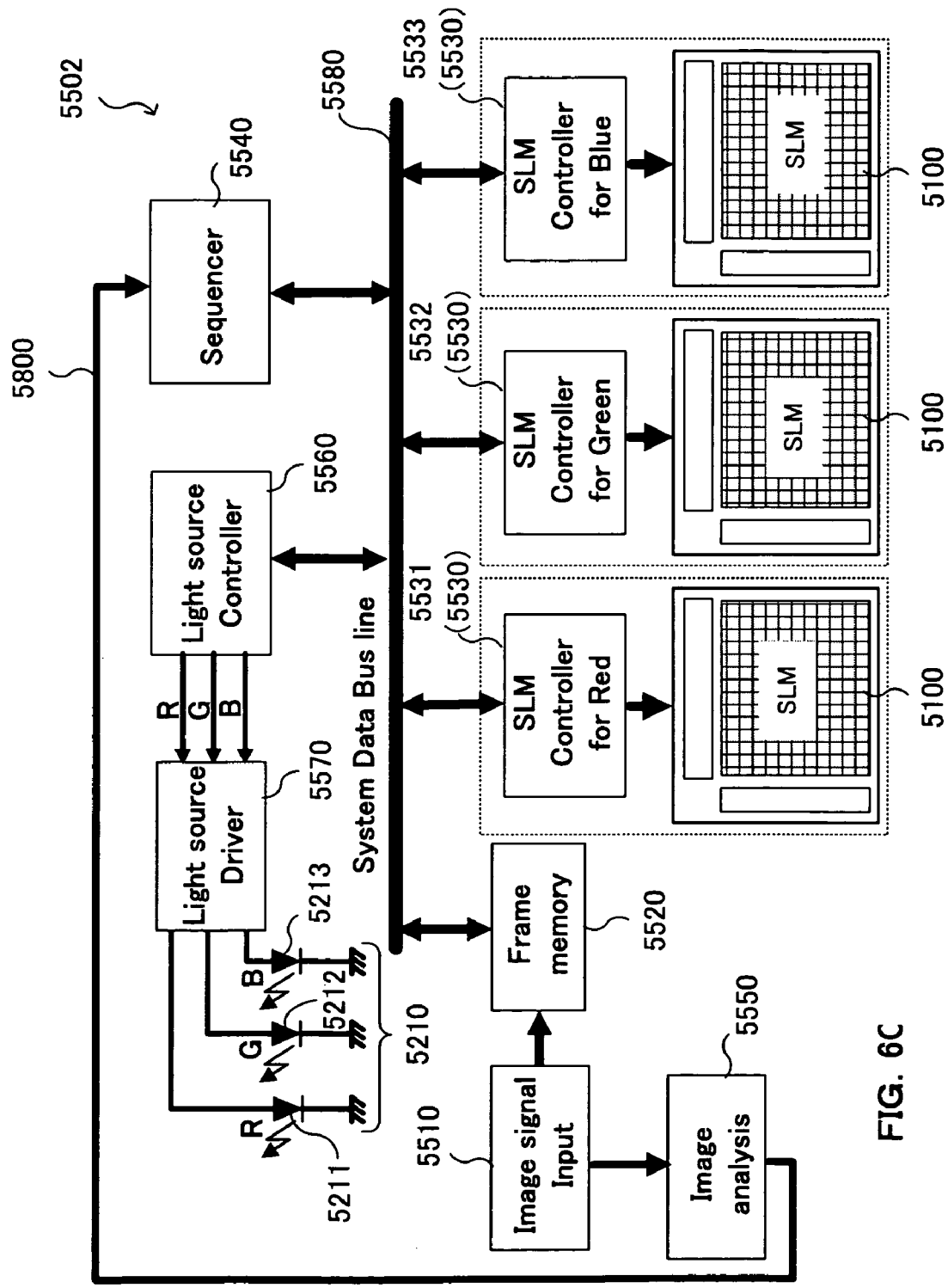
FIG. 6C is a block diagram for illustrating the configuration of the control unit of a multi-panel projection apparatus according to a preferred embodiment of the present invention.

FIG. 6C is a block diagram illustrating the configuration of the control unit of a multi-panel projection apparatus according to the present embodiment.

The control unit 5502 comprises SLM controllers 5531, 5532 and 5533, which are used for controlling, respectively, the spatial light modulators 5100 equipped for the colors R, G and B, and the placement of the controllers is different from the above described control unit 5500, which is otherwise similar.

That is, SLM controller 5531, SLM controller 5532, and SLM controller 5533 corresponding to their respective color-use spatial light modulators 5100 are set on the same substrates as those of their respective spatial light modulators 5100. This configuration makes it possible to place the spatial light modulators 5100 and their corresponding SLM controller (5531, 5532, and 5533) close to each other, thereby enabling a high-speed data transfer rate.

Further, a system bus 5580 connects the frame memory 5520, light source control unit 5560, sequencer 5540 and SLM controllers 5531 through 5533, in order to speed up and simplify the connection path of each connecting element.

Figure 6D:
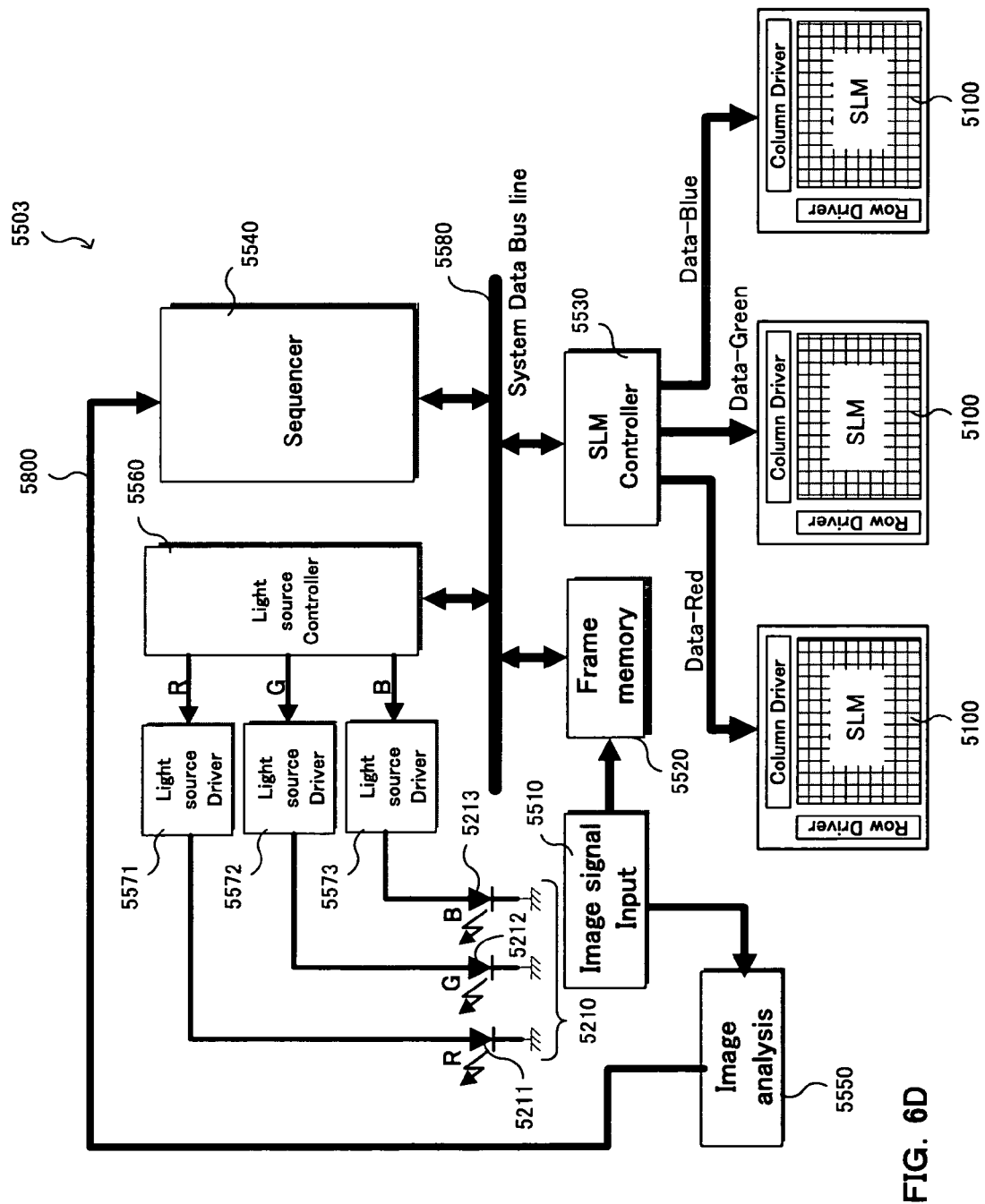
FIG. 6D is a block diagram for showing a modification of the configuration of a control unit used for multi-panel projection apparatus according to a preferred embodiment of the present invention.

FIG. 6D is a block diagram showing an alternate configuration of a control unit used for multi-panel projection apparatus according to the present embodiment.

The control unit 5503 differs from the above described control unit 5500 only in that the former is equipped with 1) a light source drive circuit 5571, a light source drive circuit 5572, and a light source drive circuit 5573, which are used for red laser light source 5211, green laser light source 5212, and blue laser light source 5213, respectively, and 2) a common SLM controller 5530 that controls spatial light modulators 5100 equipped for the colors R, G and B.

The configuration in FIG. 6D makes it possible for a single chip SLM controller 5530 to control the spatial light modulators 5100, thereby reducing the size of the apparatus.

Here follows a detailed description of the light source drive circuit according to the present embodiment.

Figure 7A:
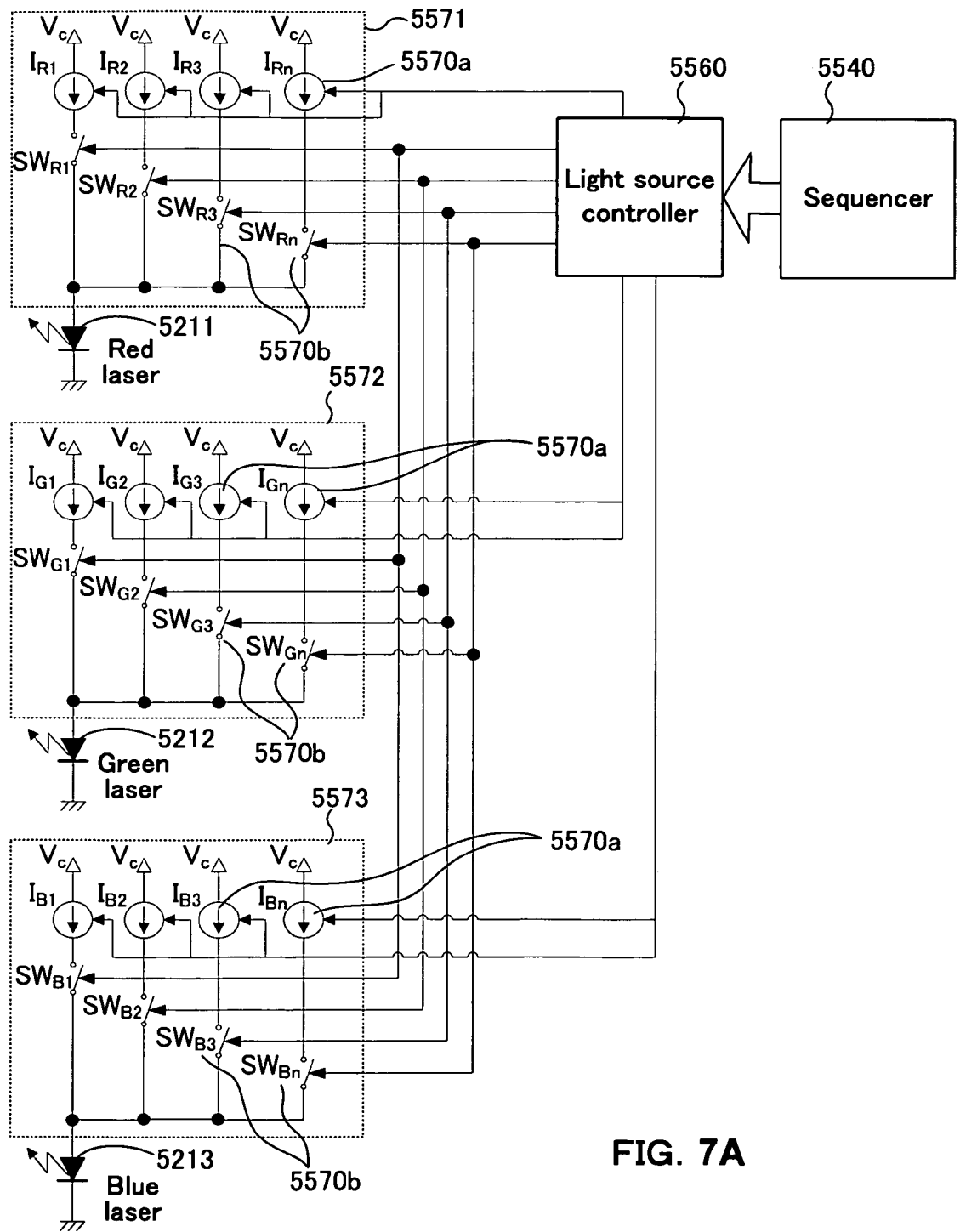
FIG. 7A is a block diagram for illustrating the configuration of the light source drive circuit of a projection apparatus according to a preferred embodiment of the present invention.

FIG. 7A is a conceptual diagram illustrating the configuration of the light source drive circuit 5570 (i.e., the light source drive circuits 5571, 5572 and 5573) according to the present embodiment.

The light source drive circuit as shown in FIG. 7A comprises constant current circuits 5570a (i.e., I (R, G, B)$_1$ through I (R, G, B)$_n$) which correspond to switching circuits 5570b (i.e., switching circuits SW (R, G, B)$_1$ through SW (R, G, B)$_n$), in order to obtain the desired light intensities of emission P$_1$ through P$_n$ for the variable light sources 5210 (i.e., red laser light source 5211, green laser light source 5212, and blue laser light source 5213).

The switching circuit 5570b switches the variable light source 5210, i.e., red laser light source 5211, green laser light source 5212, and blue laser light source 5213, in accordance with the desired emission profile of.

The setup values of the output current of the constant current circuits 5570a (i.e., constant current circuits I (R, G, B)$_n$), when the gray scale of the emission intensity of the variable light source 5210 is designated at N bits (where N≧n), are as follows:

$$I(R, G, B)_1 = I_{th} + LSB$$
$$I(R, G, B)_2 = LSB + 1$$
$$I(R, G, B)_3 = LSB + 2$$
$$...$$
$$...$$
$$I(R, G, B)_n = MSB$$

This is an example of a gray scale display based on an emission intensity. A similar gray scale display is achievable even if the emission period (i.e., the emission pulse width), emission interval, i.e., the emission cycle, are made to be variable.

The relationship between the emission intensity of the variable light source and the drive current for each color in this case is as follows. Note that "k" is an emission efficiency corresponding to the drive current:

$$P_1 = k*(I_{th} + I_1)$$
$$P_2 = k*(I_{th} + I_1 + I_2)$$
$$...$$
$$...$$
$$P_n = k*(I_{th} + I_1 + I_2 + ... + I_{n-1} + I_n)$$

Figure 7B:
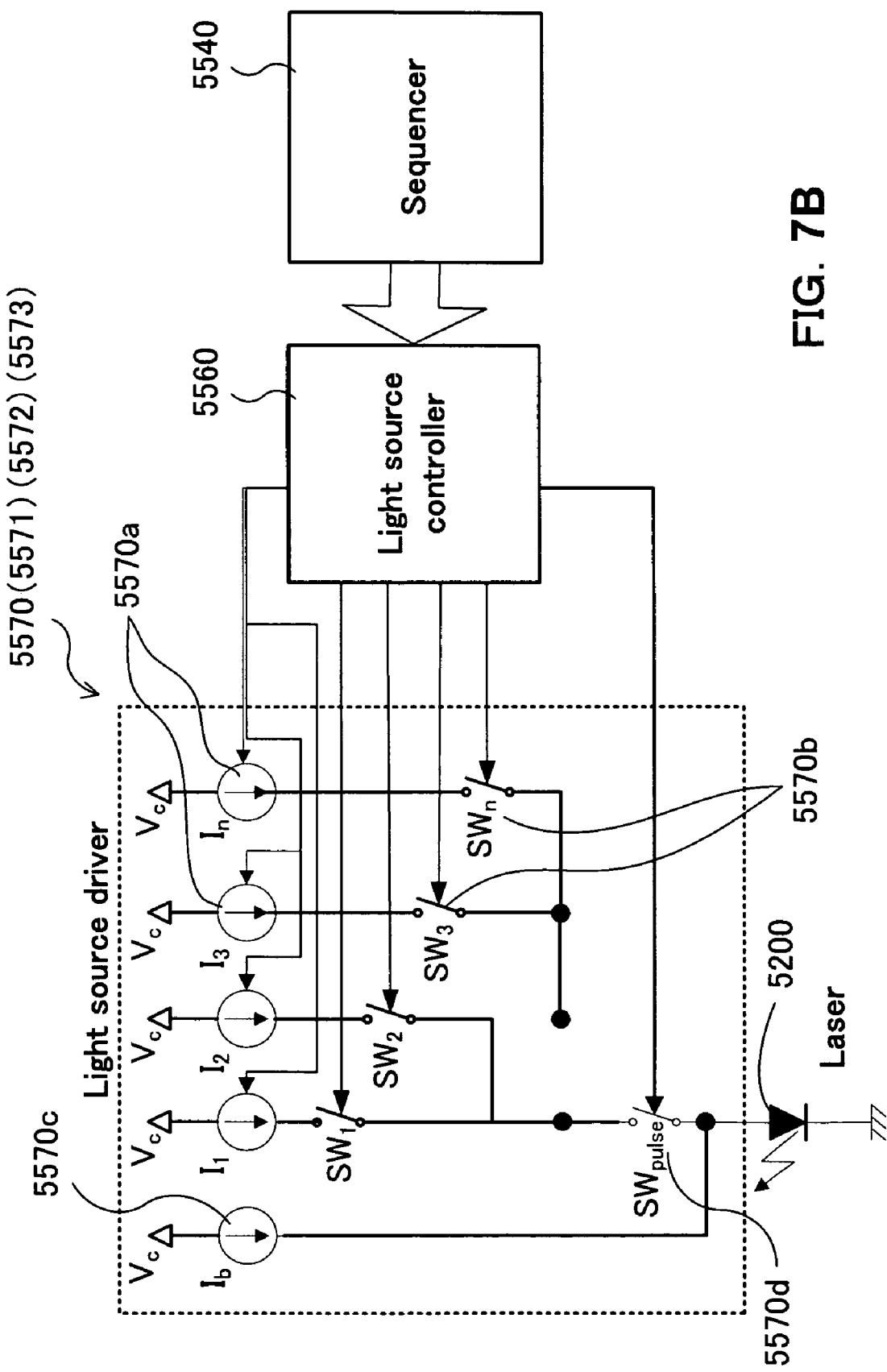
FIG. 7B is a block diagram for illustrating a modification of the configuration of the light source drive circuit of a projection apparatus according to a preferred embodiment of the present invention.

FIG. 7B is a block diagram for showing an alternate configuration of the light source drive circuit as another exemplary embodiment of this invention.

FIG. 7B is a circuit diagram to show the constant current circuits 5570a (I (R, G, B)$_1$ through I (R, G, B)$_n$) as constant current circuits 5570a (I$_1$ through I$_n$) and the switching circuits 5570b (SW (R, G, B)$_1$ through SW (R, G, B)$_n$) as switching circuits 5570b (SW$_1$ through SW$_n$).

As will be described below, the light source drive circuits 5570 according to the present embodiment is configured to make the individual constant current circuit 5570a (i.e., I (R, G, B)$_1$ in this case) to supply a bias current I$_b$ equivalent to the threshold current I$_{th}$ of the variable light source 5210 or close to the threshold current when a semiconductor laser is used as the variable light source 5210. This is because a high speed current drive is required to stabilize the switching operation of the light source drive circuits 5570 of the present embodiment and also to enable a high speed emission.

FIG. 7B shows the light source drive circuits 5570, i.e., light source drive circuit 5571, light source drive circuit 5572, and light source drive circuit 5573, comprises bias current circuits 5570c, which are continuously connected to the variable light source 5210, i.e., red laser light source 5211, green laser light source 5212, and blue laser light source 5213, and which are used for applying a bias current I$_b$, in addition to the constant current circuits 5570a.

Furthermore, the constant current circuits 5570a are connected to the variable light source 5210 through a high speed switching circuit 5570d (SW$_{pulse}$) disposed on the downstream side of the switching circuits 5570b. As described later, in order to achieve a high speed current drive, the high speed switching circuit 5570d of the light source drive circuit 5570 is placed on the same substrate as the variable light source 5210 or placed within a same package near the variable light source 5210 by.

According to the configuration shown in FIG. 7B, the relationship between the emission intensity P$_n$ and drive current of the variable light source for each wavelength is as follows, where "k" is the emission intensity in terms of drive current:

$$P_b = k*I_b(I_b \approx I_{th})$$
$$P_1 = k*(I_{th} + I_1)$$
$$P_2 = k*(I_{th} + I_1 + I_2)$$
$$...$$
$$...$$
$$P_n = k*(I_{th} + I_1 + I_2 + ... + I_{n-1} + I_n)$$

That is, the relationship between each switching operation and emission output is as follows:

$$SW_{pulse} = OFF: P_b = k*I_b \approx 0[mW](where\ I_b \approx I_{th})$$
$$SW_1: P_1 = k*(I_b + I_1)$$
$$SW_2: P_2 = k*(I_b + I_1 + I_2)$$
$$...$$
$$SW_n: P_n = k*(I_b + I_1 + I_2 + ...\ I_{n-1} + I_n)$$

Figure 8:
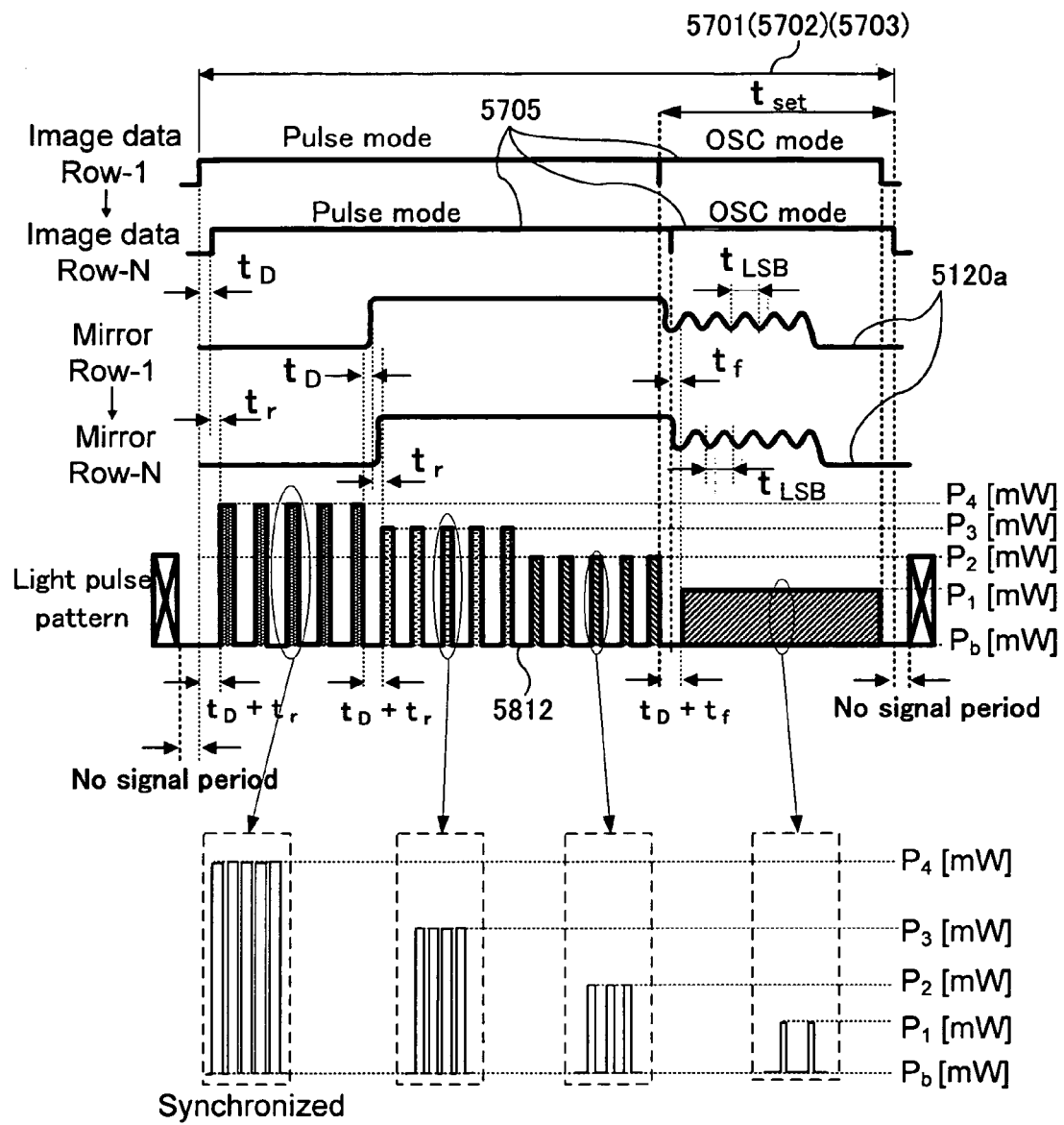
FIG. 8 is a chart for illustrating an exemplary control scheme for a spatial light modulator using non-binary data according to the embodiment of the present invention.

This makes it possible to attain an emission profile possessing an emission intensity P$_b$ that is nearly zero as shown in FIG. 8, which is described later in detail.

The use of the switching circuits 5570d illustrated in FIG. 7B makes it possible to implement a circuit operation unaffected by a drive current switching over due to switching circuits 5570b (SW$_1$ through SW$_n$), which are connected to the respective constant current circuits 5570a. Better image quality may be achieved if the switching circuits 5570b (SW$_1$ through SW$_n$) are switched over when the variable light source (i.e., the variable light source 5210) is not emitting light.

The configuration shown in FIG. 7B is provided with a fixed current value for the bias current value. It can alternatively be configured, however, with variable Ÿbias current by connecting the constant current circuit 5570c to the light source control unit 5560, so that the bias current change in accordance with the heating value of the variable light source 5210. The heating value of variable light source 5210 changes due to the ambient temperature which is influenced by the drive condition of 5210, such as the emission pulse width and pulse emission intervals (i.e., frequency), and by the emission period under each drive condition. Variable current values for the bias current value thereby achieve a more stable control for the variable light source.

Figure 9:
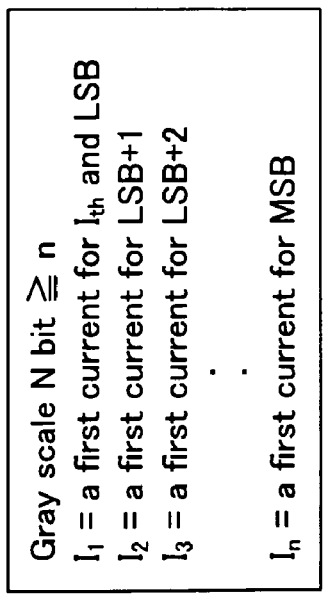
FIG. 9 is a diagram for showing the relationship between the applied current and the emission light intensity of a light source drive circuit in the embodiment of the present invention.
Figure 9:
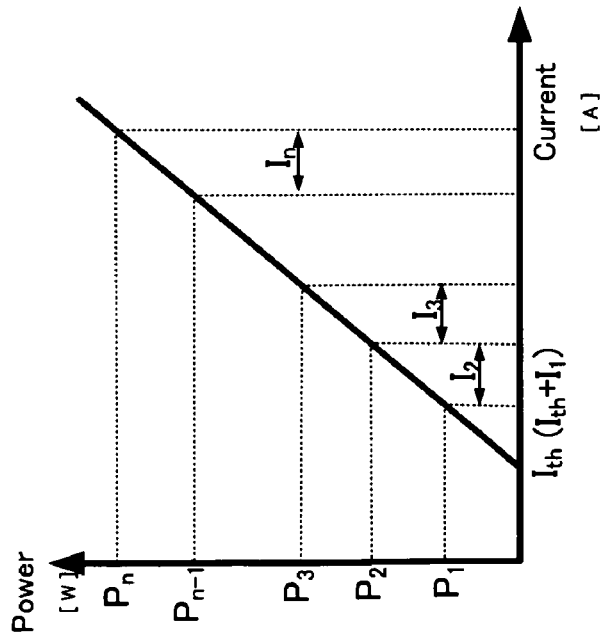

FIG. 9 is a chart showing the relationship between the applied current I of the light source drive circuit shown in the above described FIG. 7A and the emission intensity $P_n$.

Figure 10:
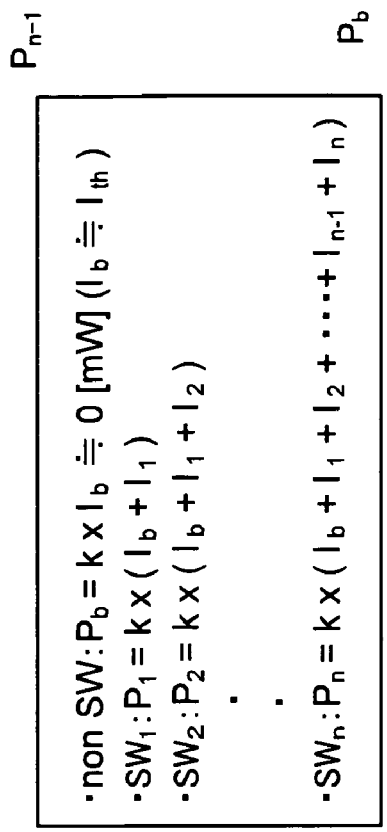
FIG. 10 is a diagram for showing the relationship between the emission light intensity and the applied current in the constant current circuit of a light source drive circuit according to the embodiment of the present invention.
Figure 10:
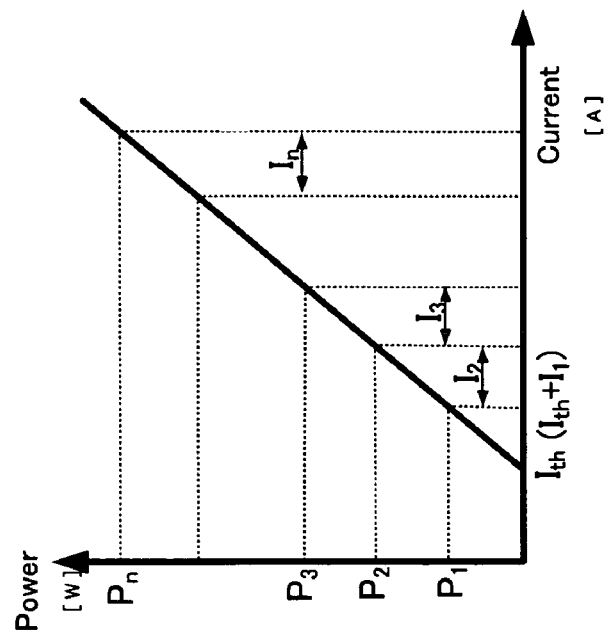

FIG. 10 is a diagram for showing the relationship between the applied current I of the constant current circuit 5570a of the light source drive circuit shown in FIG. 7B and the emission intensity $P_b$ and emission intensity $P_n$.

Note that the descriptions for FIGS. 7A and 7B assume that the changes in the emission profiles of the variable light source for each sub-frame correspond to each gray scale bit; if the display gray scale function of the spatial light modulator 5100 is used, the number of required levels of electrical current decreases, reducing the numbers of constant current circuits 5570a and switching circuits 5570b needed and making it possible to obtain a number of gray scales equal to, or higher than, the displayable gray scales of the spatial light modulator 5100.

Here follows a detailed description of an example of the configuration of the spatial light modulator 5100 according to the present embodiment.

The spatial light modulator 5100 according to the present embodiment is a deflectable mirror device that arrays the mirror elements.

Figure 11:
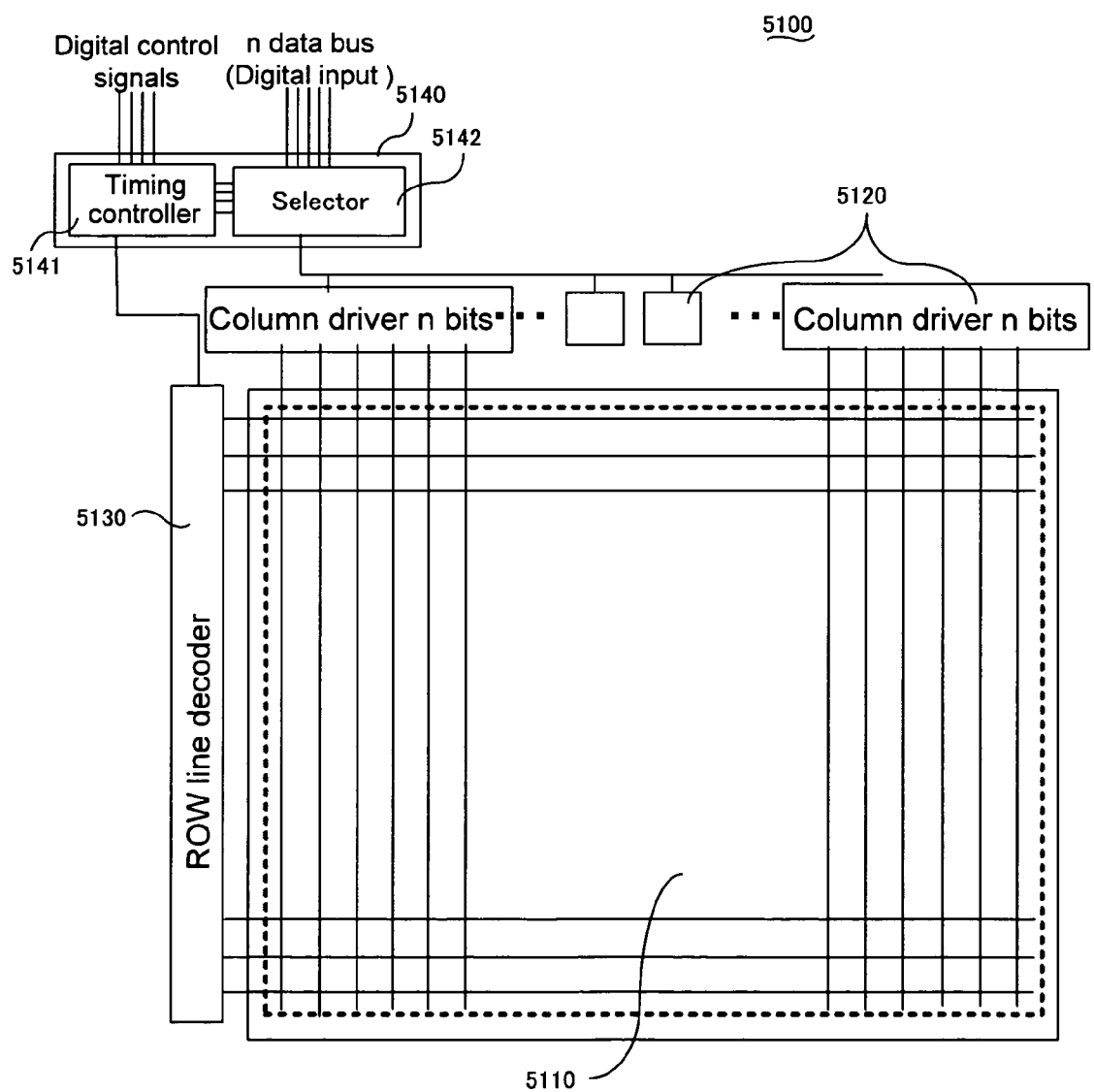
FIG. 11 is a schematic diagram for illustrating the layout of the internal configuration of a spatial light modulator according to the embodiment of the present invention.

FIG. 11 is a block diagram for illustrating the layout of the internal configuration of the spatial light modulator 5100 according to the present embodiment.

Figure 12:
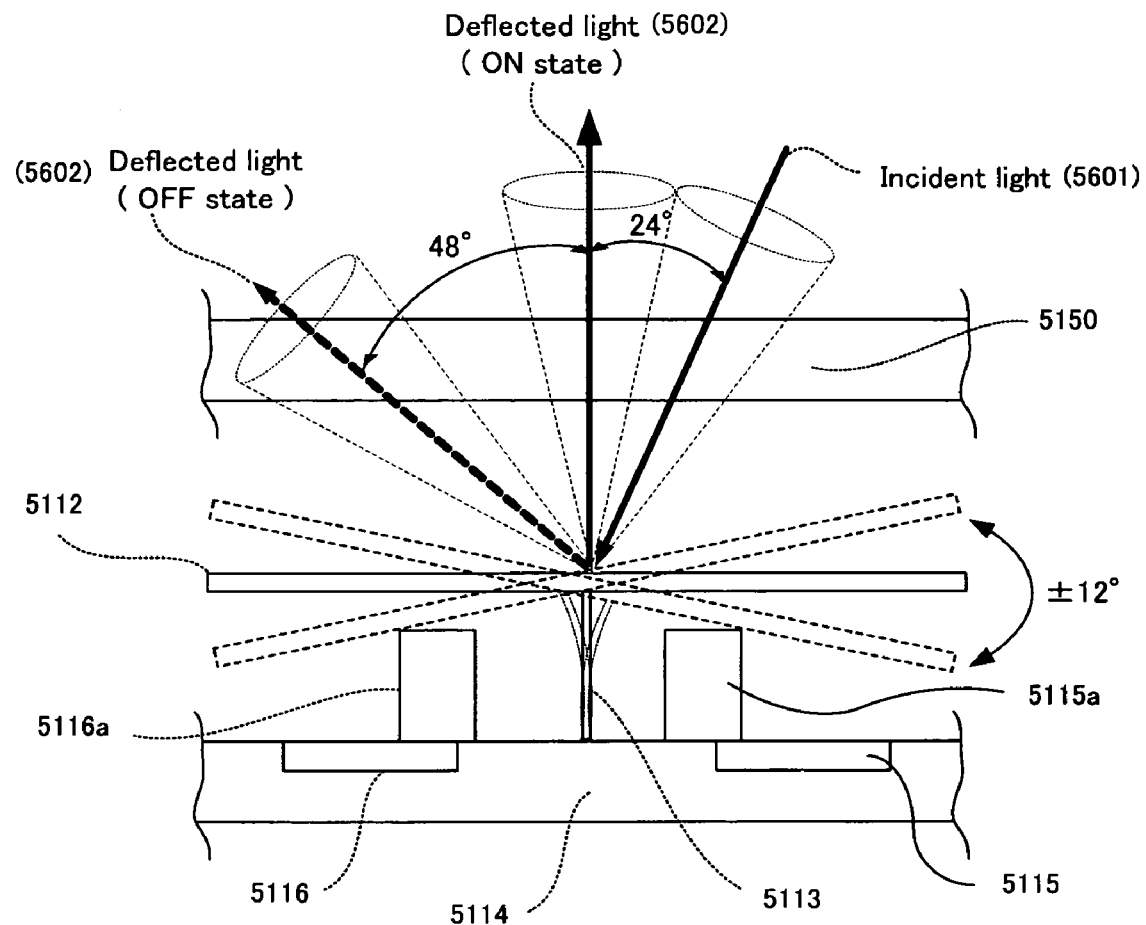
FIG. 12 is a cross-sectional diagram of an individual pixel unit constituting a spatial light modulator according to the embodiment of the present invention.
Figure 13:
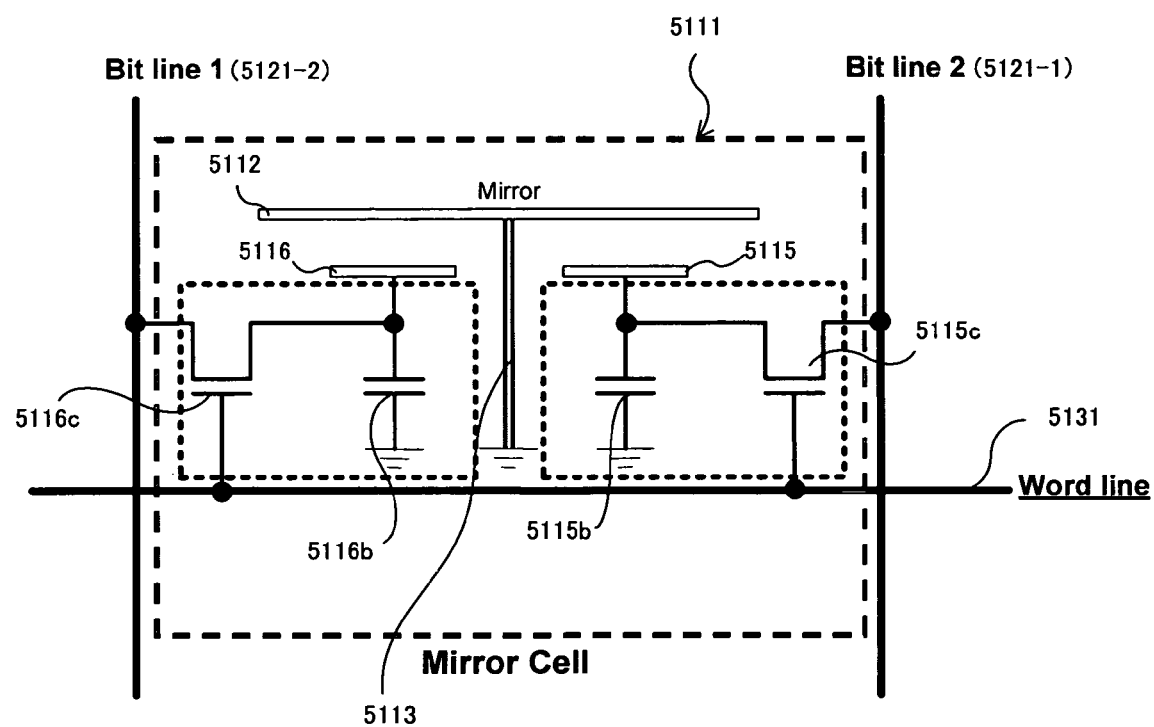
FIG. 13 is a side cross sectional diagram for illustrating the configuration of an individual pixel unit constituting a spatial light modulator according to the embodiment of the present invention.

FIG. 12 is a cross-sectional diagram of an individual pixel unit as a basic unit of the spatial light modulator 5100 according to the present embodiment. FIG. 13 is a block diagram for illustrating the circuit and control configuration of the individual pixel unit as a basic unit of the spatial light modulator 5100 according to the present embodiment.

As illustrated in FIG. 11, the spatial light modulator 5100 comprises a mirror element array 5110, column drivers 5120, ROW line decoders 5130, and an external interface unit 5140.

The external interface unit 5140 includes a timing controller 5141 and a selector 5142. The timing controller 5141 controls the ROW line decoder 5130 based on a timing signal from the SLM controller 5530. The selector 5142 supplies the column driver 5120 with a digital signal from the SLM controller 5530.

In mirror element array 5110, mirror elements are positioned where individual bit lines 5121, which extend vertically from column drivers 5120, crosses individual word lines 5131, which extend from ROW decoders 5130.

As illustrated in FIG. 12, the individual mirror element 5112 tilts freely while supported by a hinge 5113 on a substrate 5114. The mirror 5112 is covered with a cover glass 5150 for protection.

An OFF electrode 5116 (and an OFF stopper 5116a) and an ON electrode 5115 (and an ON stopper 5115a) are positioned symmetrically across the hinge 5113 on the substrate 5114.

The OFF electrode 5116 attracts the mirror 5112 with a Coulomb force by applying a predetermined voltage and tilts the mirror 5112 to make contact with the OFF stopper 5116a. This causes the incident light 5601 incident to the mirror 5112 to be reflected to the light path of an OFF position that is offset from the optical axis of the projection optical system 5400. The state of a mirror (or a mirror element) in this condition is called an OFF state.

The ON electrode 5115 attracts the mirror 5112 with a Coulomb force by applying a predetermined voltage and tilts the mirror 5112 to make contact with the ON stopper 5115a. This causes the incident light 5601 incident to the mirror 5112 to be reflected to the light path of an ON position matching the optical axis of the projection optical system 5400. The state of the mirror (or the mirror element) in this condition is called an ON state.

In addition, a mirror 5112 (or a mirror element 5111) has an intermediate state in which a portion of the incident light is reflected toward the projection optical system 5400. The intermediate state of the mirror (or the mirror element) may be implemented by an oscillation state in which a portion of the incident light 5601 is reflected toward the projection optical system 5400 by the mirror (or the mirror element) performing a free oscillation at the inherent oscillation frequency between the ON and OFF states. Furthermore, the state in which a part of the incident light 5601 incident to the mirror 5112 is reflected toward the projection optical system 5400 may be generated by maintaining the initial state of the mirror 5112.

Note that the oscillation state of a mirror (or a mirror element) is achieved by removing a predetermined potential, which has been applied to an electrode in the ON or OFF state of the mirror, and thereby removing the Coulomb force generated between the mirror 5112 and the electrode.

Figure 14:
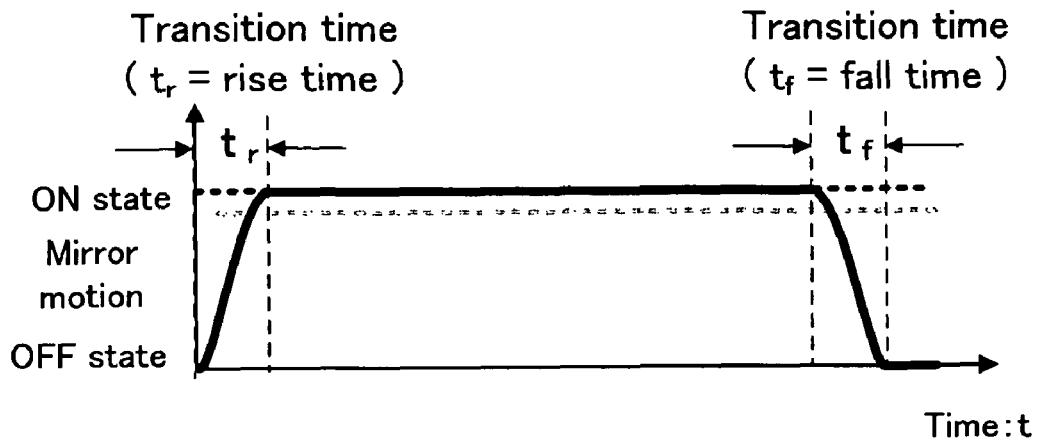
FIG. 14 is a diagram for showing the transition between the ON state and OFF state of a mirror of a spatial light modulator.

FIG. 14 is a timing diagram for showing a transition response between the ON and OFF state of the mirror 5112. In the transition from the OFF state, in which the mirror is attracted by the OFF electrode 5116 and contacts the OFF stopper 5116a, to the ON state, to the ON state, in which the mirror is attracted by the ON electrode 5115 and contacts the ON stopper 5115a, a rise time $t_r$ is required before the transition to a complete ON state is reached. Likewise a fall time $t_f$ is required before the transition to a complete OFF state is reached.

The reflection light 5602 is in the transition state in the period between the rise time $t_r$ and the fall time $t_f$. By applying an ON/OFF dual-states control, the light emitted in the transition state generates a light processed by the control system as an uncontrollable interference in controlling a grayscale display. Therefore, the present embodiment is configured to carry out such a control so as to suppress the emission of the variable light source 5210, as described later, thereby eliminating a use of the reflection light 5602 in the transition state.

Figure 15:
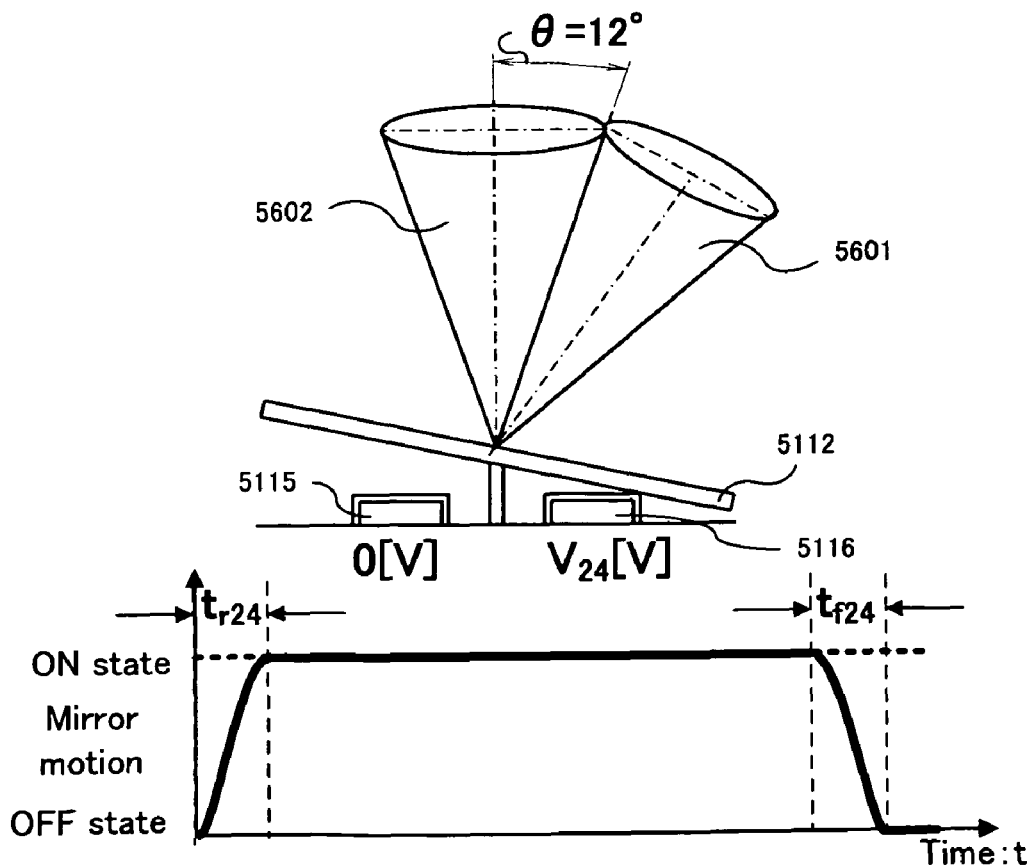
FIG. 15 is a side view diagram for showing the tilt state of a mirror when a light source with non-directivity, such as a high-pressure mercury lamp or a xenon lamp, is used.

FIG. 15 is a timing diagram showing together with a side cross section view of a tilting state of the mirror 5112 implemented with a non-directional light source, such as a high-pressure mercury lamp or a xenon lamp.

According to the conventional technique, the expansions of incident light 5601 and reflection light 5602 has a greater angular range. Therefore, the tilt angle of the mirror 5112 is set at about ±12 degrees, i.e., totally 24 degrees in both directions, in order to increase contrast by avoiding interference between the aforementioned 5601 and 5602. Consequently, both the rise time $t_{r24}$ and fall time $t_{f24}$ are extended in the ON/OFF control of the mirror 5112 and a voltage ($V_{24}$) to be applied to the ON electrode 5115 and OFF electrode 5116 for tilting the mirror 5112 by means of a static electric attraction must also be increased.

Figure 16:
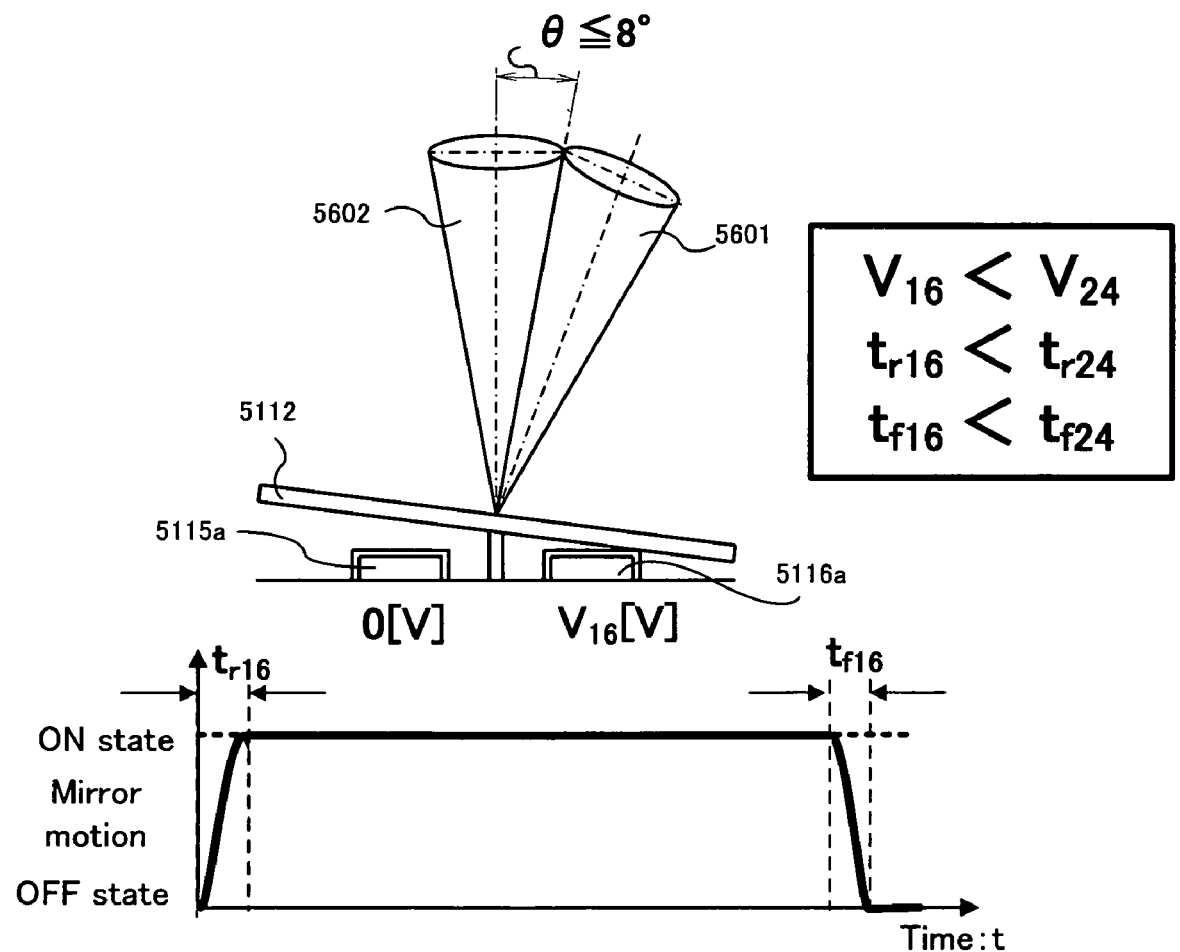
FIG. 16 is a side view diagram for showing the ON/OFF control of a mirror of a spatial light modulator according to the embodiment of the present invention.

FIG. 16 is a timing diagram for showing the ON/OFF control of the mirror 5112 in a spatial light modulator 5100 according to the present embodiment.

The projection apparatus is configured as the variable light sources 5210 includes red laser light source 5211, green laser light source 5212, and blue laser light source 5213. All of these light sources have high coherence of projection and thereby make it possible to decrease the tilting angle θ of the mirror 5112 to about ±8 degrees, 16 degrees on both directions.

As a result, the rise time $t_{r16}$ and fall time $t_{f16}$ is lesser than the conventional rise time $t_{r24}$ and fall time $t_{f24}$.

Also, a voltage ($V_{16}$) applied to the ON electrode 5115 and OFF electrode 5116 for tilting the mirror 5112 by means of a static electric attraction is lesser than the conventional voltage ($V_{24}$) because the distance between the mirror 5112 and either of the aforementioned electrodes is shortened, as described later.

Note that the deflection angle is defined as "0" degrees when the mirror is horizontal; the angle in clockwise direction (CW) is defined as plus (+); and the angle in counter-clockwise direction is defined as minus (−).

As illustrated by the above described FIG. 13, an OFF capacitor 5116b is connected to the OFF electrode 5116, and the OFF capacitor 5116b is connected to a bit line 5121-1 and a word line 5131 by way of a gate transistor 5116c.

Furthermore, an ON capacitor 5115b is connected to the ON electrode 5115, and the ON capacitor 5115b is connected a bit line 5121-2 and a word line 5131 by way of a gate transistor 5115c.

The signals received on the word line 5131 control the turning on and off of the transistor 5116c and transistor 5115c.

More specifically, the mirror elements 5111, which are on one horizontal row in line with an arbitrary word line 5131, are simultaneously selected, and the charging and discharging of the OFF capacitor 5116b and ON capacitor 5115b are controlled by bit lines 5121-1 and 5121-2, respectively. Thus the ON and OFF states of the mirrors 5112 of the individual mirror elements 5111 are controlled.

Figure 17:
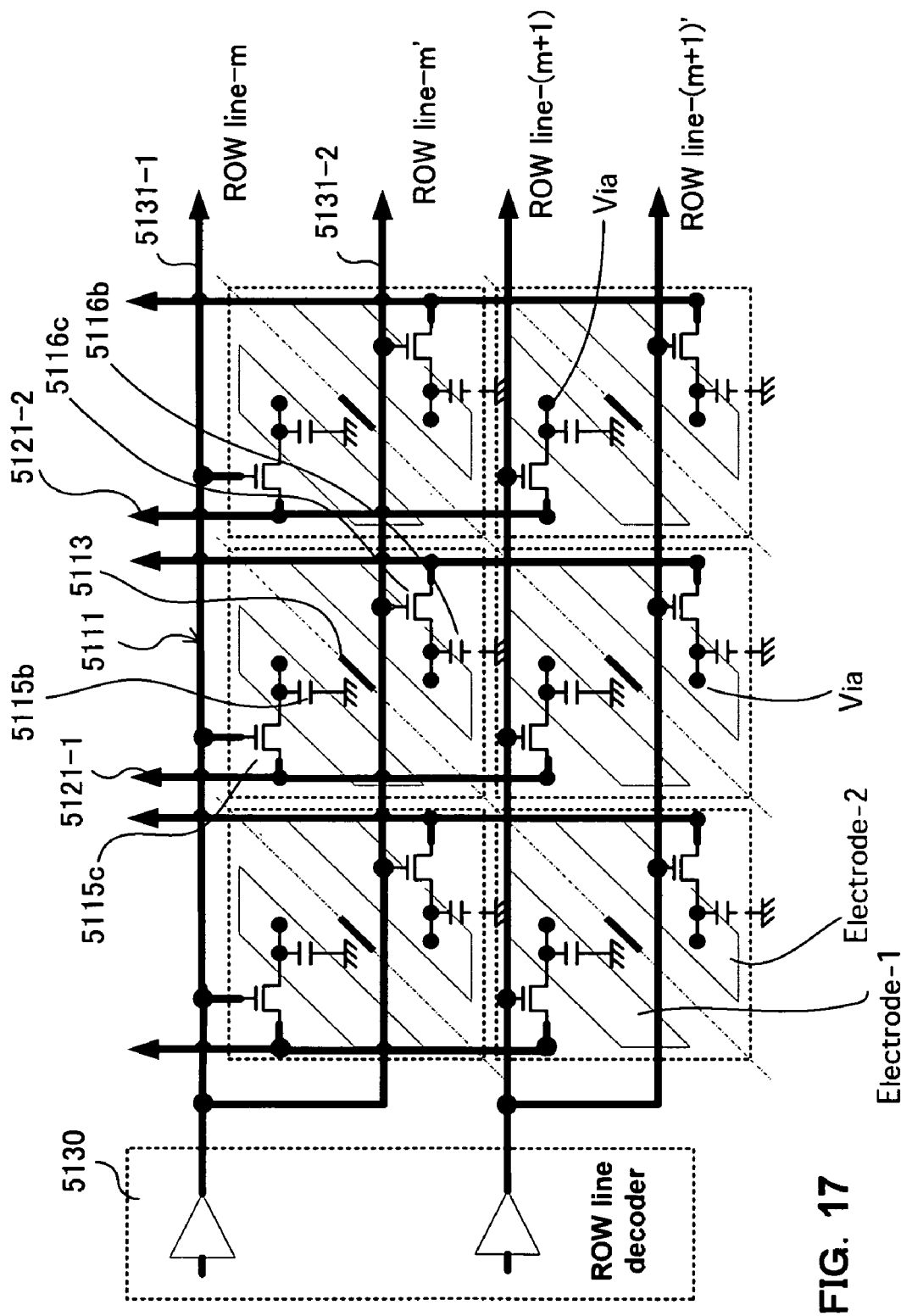
FIG. 17 is a block diagram for illustrating the placement of word lines used for controlling a mirror of the spatial light modulator in a modification according to a preferred embodiment of the present invention.

FIG. 17 is a schematic diagram for illustrating the layout of word lines for controlling a mirror in a spatial light modulator of a modification according to the present embodiment.

As illustrated in FIG. 17, an alternate spatial light modulator can be configured with common word lines 5131-1 and 5131-2, as the word line 5131, for driving transistor 5115c and transistor 5116c simultaneously.

A common drive circuit (not shown) is implemented by the ROW line decoders 5130 to transmit signals and drive the word lines 5131-1 and 5131-2).

Figure 18:
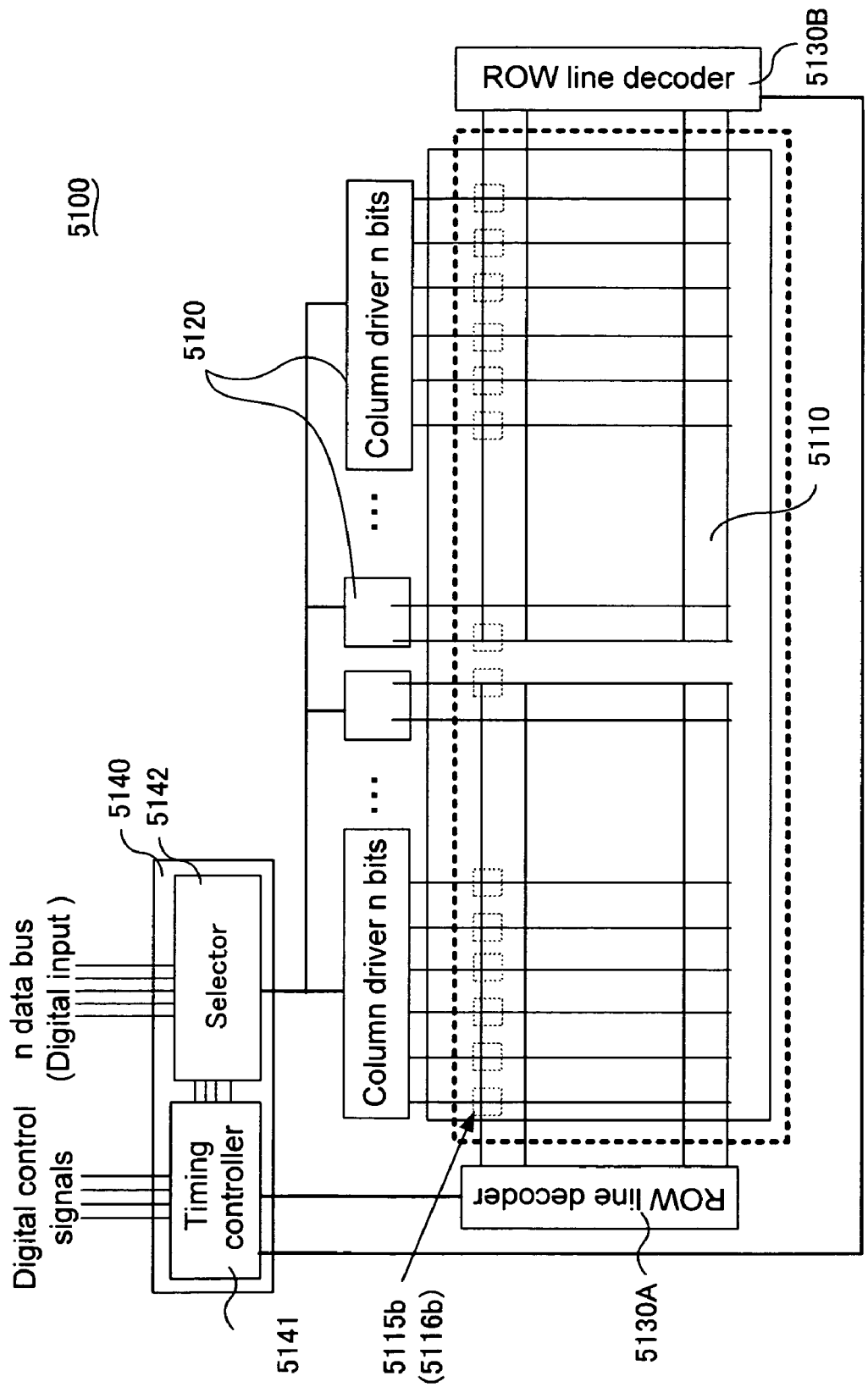
FIG. 18 is a block diagram for showing a modification of the configuration of a spatial light modulator according to the embodiment of the present invention.

As described above, signals received on the word lines 5131-1 and 5131-2 driving the transistor 5115c and gate transistor 5116c. The loading time of a charge to the ON capacitor 5115b and OFF capacitor 5116b through the transistor 5115c and transistor 5116c respectively is reduced. High speed of controlling the mirror 5112 to tilt to different angles between the ON/OFF states or in the oscillation state is achieved. FIG. 18 is a schematic diagram for illustrating an alternate configuration of a spatial light modulator according to the present embodiment.

The alternate spatial light modulator illustrated in FIG. 18 is configured with two ROW line decoders 5130A and 5130B sandwiching the mirror array 5110, with the ROW line decoder 5130A controlling half of the mirror elements 5111 arrayed in mirror element 5110, and with the ROW line decoder 5130B controlling the remaining half of the mirror elements 5111.

This alternate control configuration reduces the loading time of a charge to the ON capacitor 5115b and OFF capacitor 5116b by way of the gate 5115c and transistor 5116c, respectively, thereby accomplishing a tilting the mirror 5112 at high speed for switching between ON/OFF states or the oscillation state.

The operation of a projection apparatus is described below according to the present embodiment.

Digital video data input 5700 inputted to a video signal input unit 5510 from outside is outputted to frame memory 5520 and to a video image analysis unit 5550.

An SLM controller 5530 reads the digital video data 5700 received from the frame memory 5520. The controller 5530 converts the digital video data into binary data 5704. The binary data 5704 is pulse width-modulated, or converted into non-binary data 5705 then transmit as a control signal to a column driver 5120, by way of an external interface unit 5140. The control signal is applied by the spatial light modulator 5100 to control the ON/OFF or oscillation of the mirror 5112.

The pulse width-modulated binary data 5704 is processed to generate a pulse width in accordance with the weighting value of each bit depending on the relative position of the bit in the control word.

The non binary data 5705 converted from the digital video data 5700 becomes a bit string that includes continuous bits of "1" corresponding to the level of brightness and in this bit stream each bit of the non-binary data 5705 has the same weighting factor (e.g., "1").

Furthermore, a sequencer 5540 outputs a synchronous signal, such as VSYNC, which is output from the SLM controller 5530 synchronously with the digital video data input 5700, to the ROW line decoder 5130 of the spatial light modulator 5100.

In this configuration, the displaying/updating of one screen (i.e., one frame) is carried out by the ROW line decoder 5130 for synchronously controlling the ON/OFF or oscillation state of the mirror elements 5111 in one ROW along the word line 5131 of the micromirror 5112 in.

Figure 19:
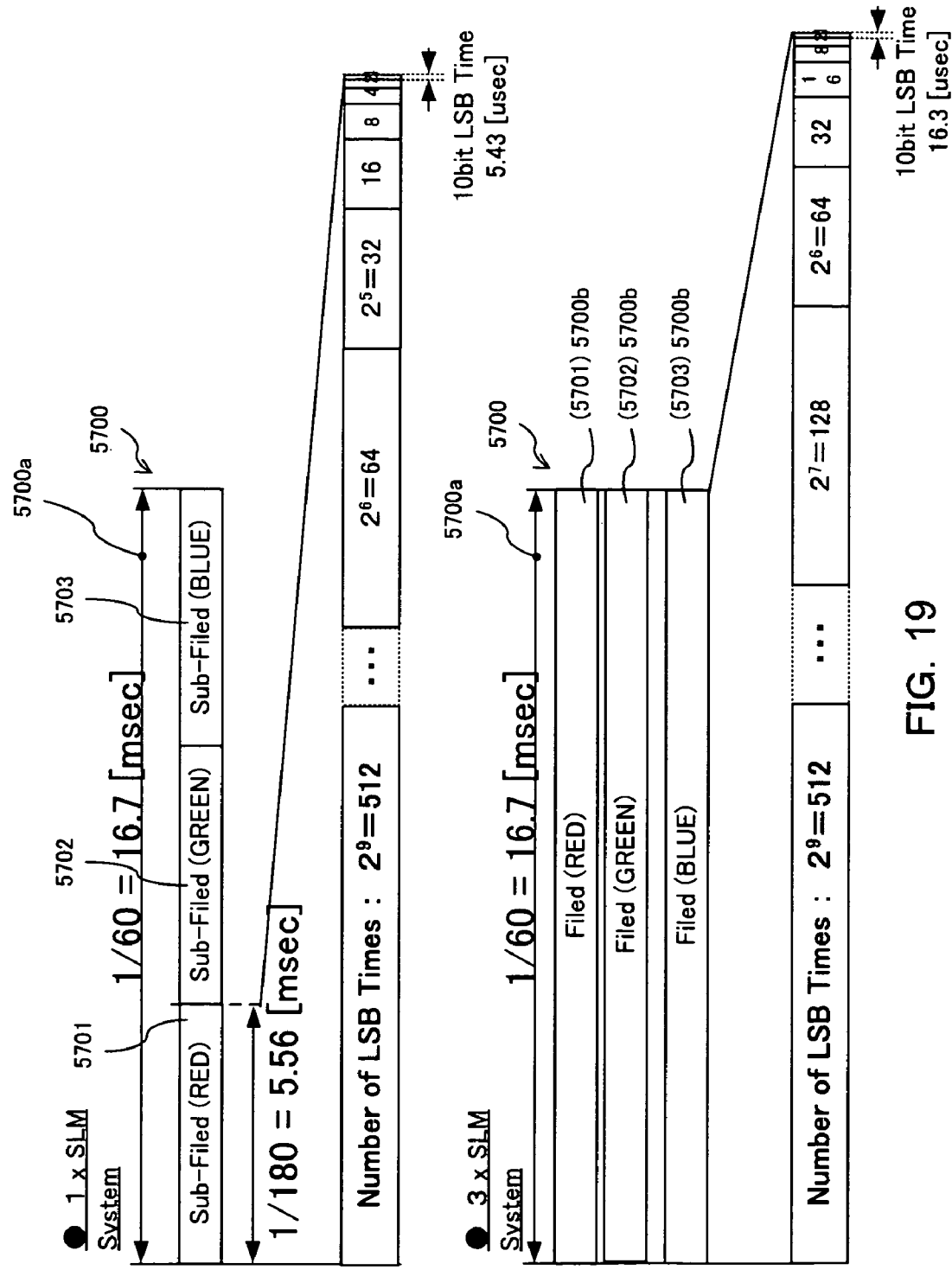
FIG. 19 is a set of data field diagrams for showing the data structure of image data used in the embodiment of the present invention.

Note that, in the case of carrying out a color display in a color sequence method using the single-panel projection apparatus (comprising one SLM) 5010 that is illustrated in the above described FIG. 4, one frame (i.e., a frame 5700-1) of the digital video data input 5700 comprises subfields, i.e., the subfield 5701, subfield 5702 and subfield 5703, which are aligned in a time series corresponding to their respective colors R, G and B as illustrated on the upper portion of FIG. 19. The above described binary data 5704 or non-binary data 5705, or mixed data (not shown in a drawing) obtained by combining these pieces of data, is generated for each of the aforementioned subfields.

At the same time, in the case of the above described multi-panel projection apparatuses (comprising three SLMs) 5020, 5030 and 5040, subfields 5700-2 (which are equivalent to subfields 5701, 5702 and 5703) corresponding to the respective colors R, G and B simultaneously output to the spatial light modulators 5100, as illustrated on the lower portion of FIG. 19, and the spatial light modulations for the respective colors are simultaneously performed.

Also in this case, the above described binary data 5704 or non-binary data 5705 is generated for each field 5700-2.

The present embodiment is configured such that the video image analysis unit 5550 of the control unit 5500 1) detects the timing of the change in signal waveforms of the binary data 5704 or non-binary data 5705 from the digital video data input 5700, 2) generates a video image analysis signal 5800 for controlling red laser light source 5211, green laser light source 5212, and blue laser light source 5213, of the variable light source 5210, and 3) inputs the generated signal to the light source control unit 5560 by way of the sequencer 5540.

This configuration implements the control for the variable light source 5210 operating synchronously with the timing of the change in signal waveforms of the binary data 5704 or non-binary data 5705 of the digital video data input 5700, as described later.

Figure 20:
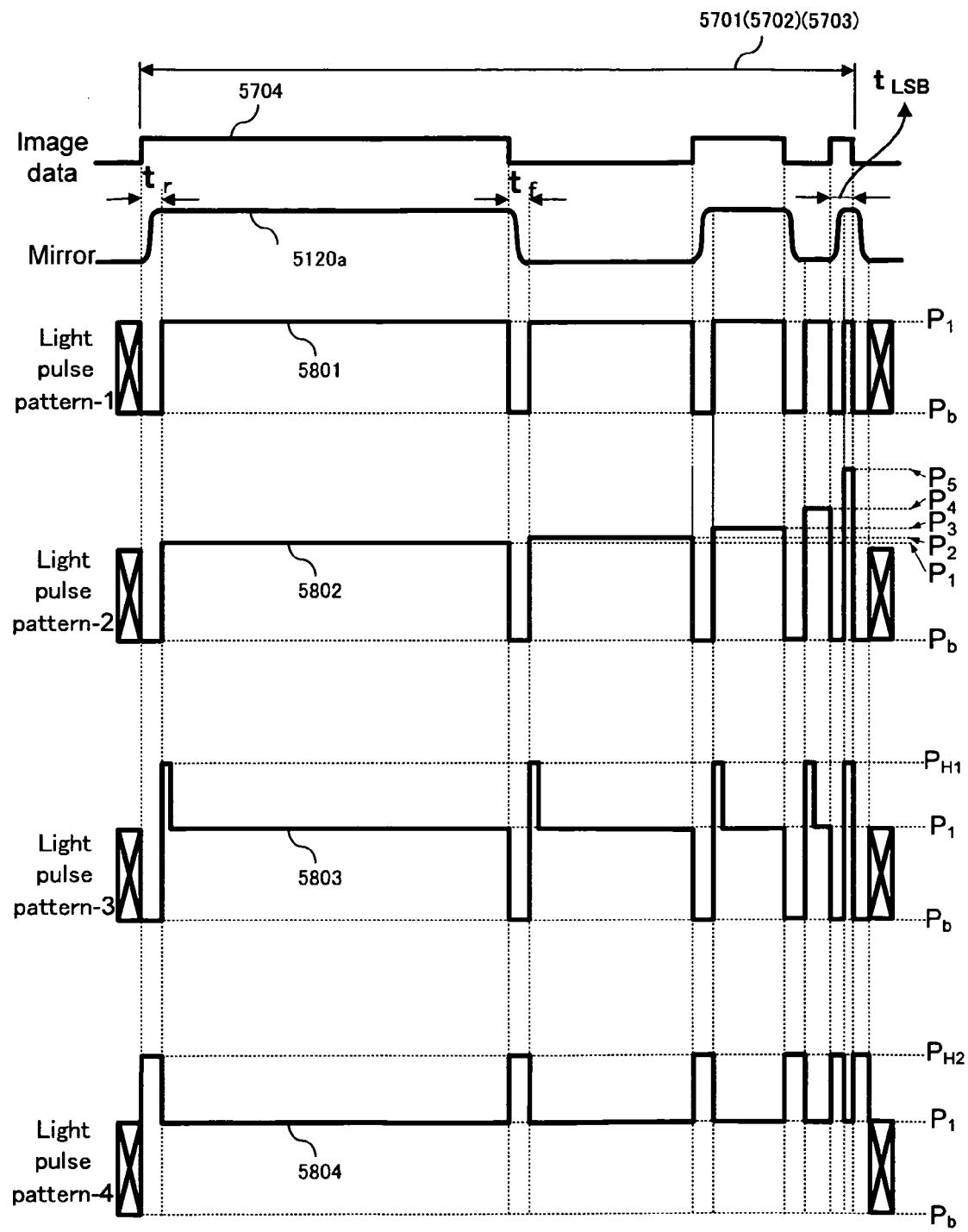
FIG. 20 is a timing diagram for illustrating the setup of a light source pulse pattern in controlling a mirror using binary data in a projection apparatus according to a preferred embodiment of the present invention.
Figure 21:
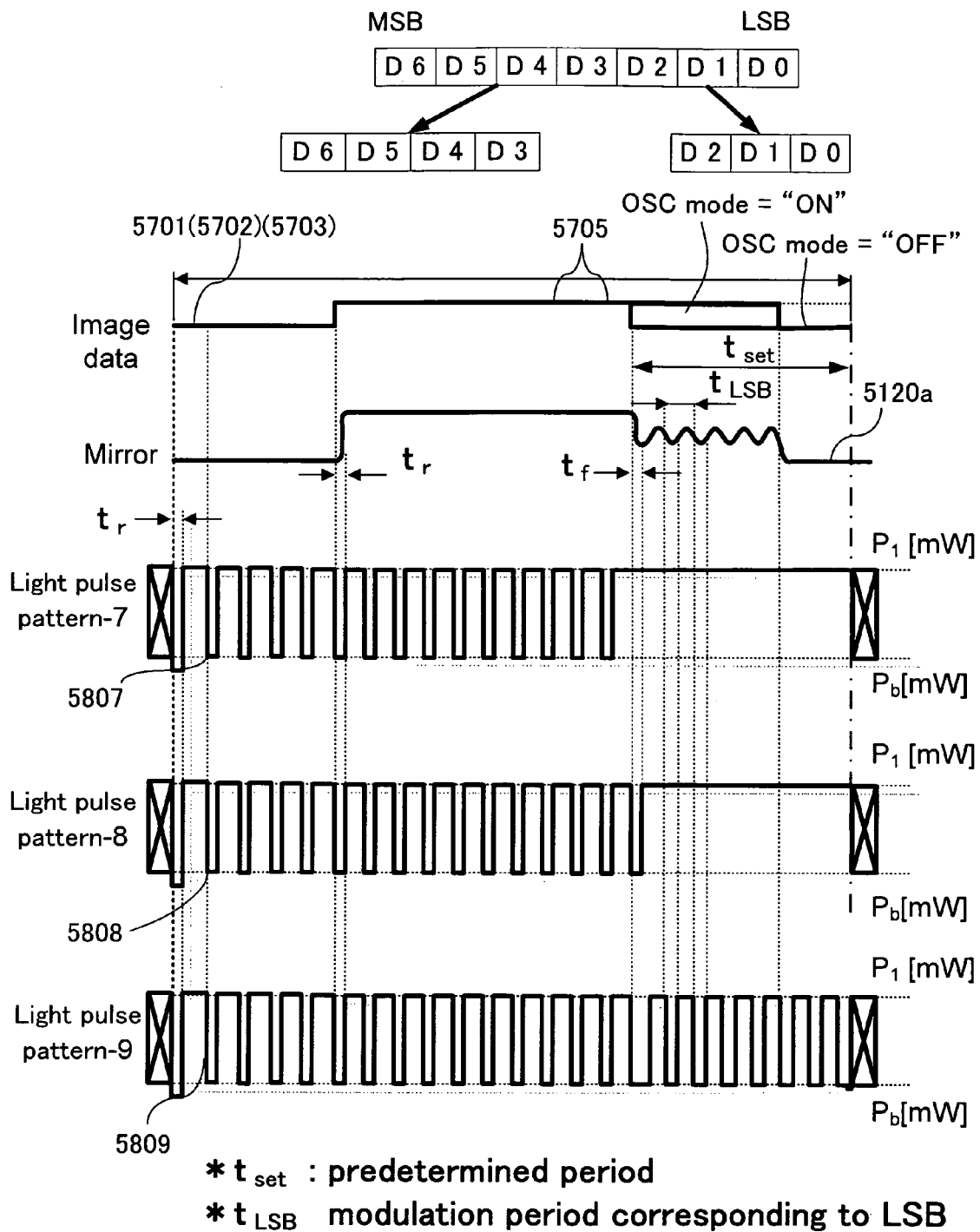
FIG. 21 is a timing diagram for illustrating the setup of a light source pulse pattern in controlling a mirror using binary data in a projection apparatus according to a preferred embodiment of the present invention.

More specifically, as illustrated in FIGS. 20 and 21, the projection apparatus according to the present embodiment is configured such that the SLM controller 5530 controls the spatial light modulator 5100. At least two mirror elements (i.e., mirror elements 5111) perform a modulation corresponding to the least significant bit (LSB) within a predetermined period of one frame. Furthermore, the light source control unit 5560 (i.e., the video image analysis unit 5550) changes the emission profiles of the variable light source in a period equal to, or less than, the predetermined period and obtains the minimum grayscale output.

This emission profile shows the change of the emission state of the variable light source 5210, such as the emission intensity, emission period, emission pulse width, emission interval, and the number of emission pulses.

This configuration makes it possible 1) to control each mirror element 5111 so that the modulation controls corresponding to the LSB of all mirror elements in each group occur within a predetermined period of time when the mirror element array 5110 of a spatial light modulator 5100, or the mirror elements of the mirror element array 5110, are controlled by being divided into groups; and 2) to control the emission profile of the variable light source 5210 in high speed within the period in which the modulation states of the desired mirror elements match.

As a result, the projection apparatus of the present embodiment is able to achieve a grade of display grayscale in high precision higher than that of the spatial light modulator 5100.

Note that when the light source control unit 5560 controls the emission profile of the variable light source 5210, it comprises a larger number of types of emission profiles than the number of display grayscale bits of the spatial light modulator 5100.

In the case of the present embodiment, when carrying out a gray scale display of binary image data by using sub-frames that have periods, which correspond to the weight of individual data bits for each frame by means of a pulse width modulation (PWM), the influence of the transition period of the modulation states is different for each frame. Furthermore, each sub-frame period is different according to the corresponding display grayscale bit as described above, and, therefore, the emission profile for each sub-frame is different. Additionally, when performing a grayscale display in excess of the display grayscale of the spatial light modulator 5100, the number of sub-frames will further increase.

FIG. 20 illustrates the control of the variable light source 5210 for controlling the spatial light modulator 5100 by means of binary data 5704.

According to the diagram, the ON/OFF state of the mirror 5112 changes as indicated by a mirror modulation control waveform 5120a by tracing the waveform of the binary data 5704. The change in the rise and fall of the mirror modulation control waveform 5120a, however, is delayed by the amount of the rise time $t_r$ and fall time $t_f$ respectively, as relative to the binary data 5704.

The present embodiment is configured to control the variable light source 5210. The variable light source 5210 is turned on only for the period when the ON section of the binary data 5704 overlaps with the ON period of the mirror modulation control waveform 5120a, with the rise time $t_r$ and fall time $t_f$ reduced to at least an LSB-corresponding modulation period $t_{LSB}$, as indicated by the light source pulse patterns 5801, 5802 and 5803.

With this control scheme, the variable light source 5210 is turned off during the transition periods of the rise time $t_r$ in which the mirror 5112 shifts from the OFF to ON state and of the fall time $t_f$ in which the mirror 5112 shifts from the ON to OFF state. This configuration enables a higher gradation than the spatial light modulator 5100 by reducing, for example, an error factor in the LSB-corresponding modulation period $t_{LSB}$.

More specifically, in the case of the present embodiment, the light source control unit 5560 controls the variable light source 5210 so that the period is reduced in which the modulation states of the spatial light modulator 5100 shift, which influences the display image.

The spatial light modulator 5100 achieves the desired display gray scale by changing the voltages applied to the individual mirror elements 5111 and the deflection state of the mirror 5112 and the like.

The transitioning of the spatial light modulator 5100 between the respective modulation states has been a limiting factor in the accuracy (e.g., resolution and linearity) of the display gray scale of the spatial light modulator 5100 and its minimum display gray scale.

In consideration of this limitation, aims to improve the accuracy of the display gray scale by 1.) using a variable light source 5210 capable of being controlled at a higher speed than the modulation state transition period of the spatial light modulator 5100 and 2.) changing the emission profiles of the variable light source 5210 at high speed during the state transition period, thereby improving the display gray scale accuracy in a projection apparatus and producing a high gradation display.

The light source pulse pattern 5801 illustrates the controlling of the variable light source 5210 so as switch between the OFF state with the constant emission intensity $P_b$ and then state with the constant emission intensity $P_1$.

Furthermore, the light source pulse pattern 5802 illustrates the controlling of the emission intensity of the variable light source 5210 during the turn-on period so that the emission intensity gradually increases from an emission intensity $P_1$ (corresponding to the MSB) to an emission intensity $P_2$, to an emission intensity $P_3$, to an emission intensity $P_4$, to an emission intensity $P_5$ (corresponding to the LSB), corresponding to the pulse widths of the binary data 5704 for which the turn-on period gradually decreases from the MSB toward the LSB depending on the weights of the respective bits.

Additionally, the light source pulse pattern 5803 illustrates performing a control so as to compensate for a light volume loss during the period the emission is suppressed in one rise time $t_r$ by locally adding the pulse of an emission intensity $P_{h1}$ that is larger than the emission intensity $P_1$ immediately after the rise time $t_r$ of the mirror modulation control waveform 5120a.

Furthermore, the light source pulse pattern 5804 illustrates the compensation for a light volume loss in the period of one rise time $t_r$ by adding two pulses of emission intensity $P_{h2}$.

These controls can be implemented by selectively turning ON in the above described switching circuit 5570b.

The light source pulse pattern 5802 makes it possible 1) to compensate for the decrease in emission intensity due to a turn-off period of a rise time $t_r$ and fall time $t_f$ on the LSB side, in which the pulse width is small and the effect of time $t_r$ and fall time $t_f$ increases, and 2) to improve the accuracy of the display gray scale.

Figure 22:
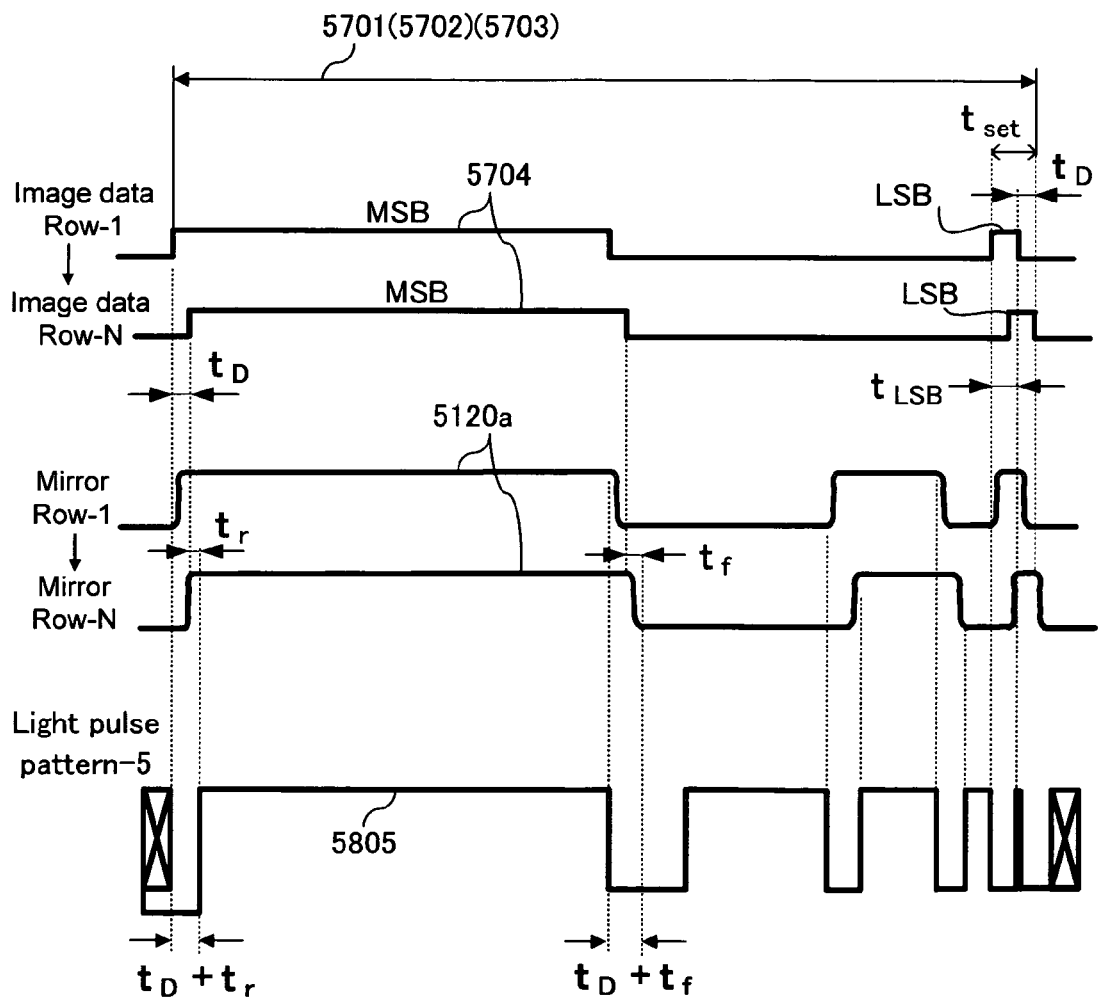
FIG. 22 is a timing diagram for illustrating the setup of a light source pulse pattern in controlling a mirror using non-binary data in a projection apparatus according to a preferred embodiment of the present invention.

Considering the N rows of the mirror element array 5110 corresponding to the N lines of horizontal scan lines as illustrated in FIG. 22, there exists a difference between the first row (Row-1) and the last row (Row-N) in the delay time $t_D$ of the control start times of the mirror modulation control waveform 5120a.

For such a case a circuit connection is accordingly configured, so that the turn-on timing is shifted by a period of time equal to [the rise time $t_r$+delay time $t_D$] for the rise side of the pulse. The turning-on time is shifted by a period of time equal to [the fall time $t_f$+delay time $t_D$] for the fall side of the pulse, and, thereby, the ON period of the mirror modulation control waveform 5120a overlaps with the ON period of the light source pulse pattern 5805 at least during the period of the LSB-corresponding modulation period $t_{LSB}$.

With this control scheme, in order to secure this overlap in the LSB-corresponding modulation period $t_{LSB}$, the following conditions must be met:

[delay time $t_D$+rise time $t_r$]<LSB-corresponding modulation period $t_{LSB}$, and

[delay time $t_D$+fall time $t_f$]<LSB-corresponding modulation period $t_{LSB}$ Therefore, the present embodiment is configured such that the SLM controller 5530 groups the mirror elements 5111 of the spatial light modulator 5100 so that the emission period of the changed emission profile of the variable light source 5210 is less than the modulation period corresponding to the LSB of the spatial light modulator 5100 and controls the mirror elements 5111 in units of the group.

Figure 23:
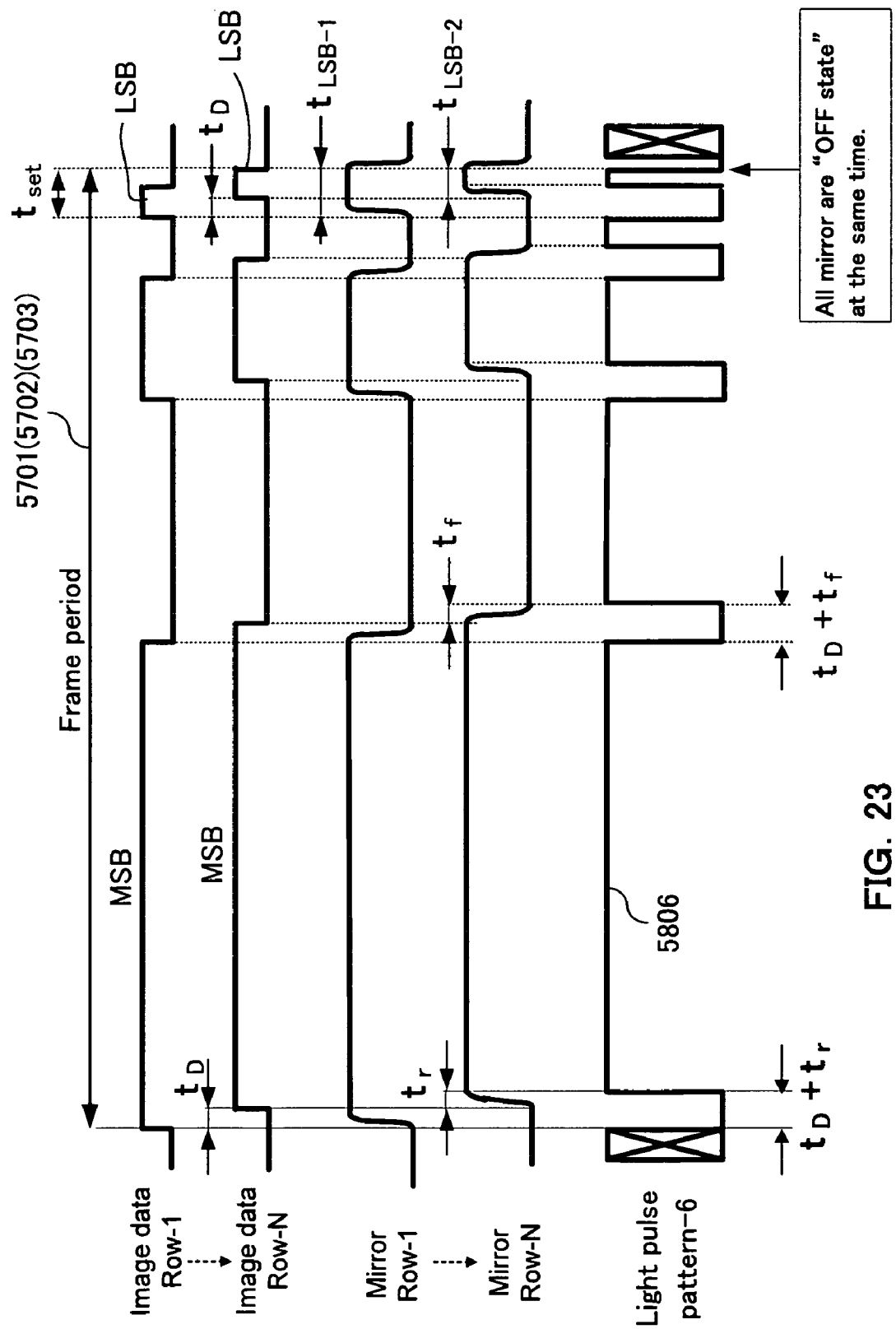
FIG. 23 is a timing diagram for illustrating a modification of the setup of a light source pulse pattern in controlling a mirror using binary data in a projection apparatus according to a preferred embodiment of the present invention.

Furthermore, the SLM controller 5530 controls changing the modulation periods corresponding to the LSB of the individual mirror elements (i.e., LSB-corresponding modulation period $t_{LSB-1}$ and LSB-corresponding modulation period $t_{LSB-2}$) as required so that the modulation periods corresponding to the LSB (i.e., LSB-corresponding modulation period $t_{LSB}$) of the individual mirror elements 5111 overlap at least in part, as illustrated in FIG. 23.

Figure 24:
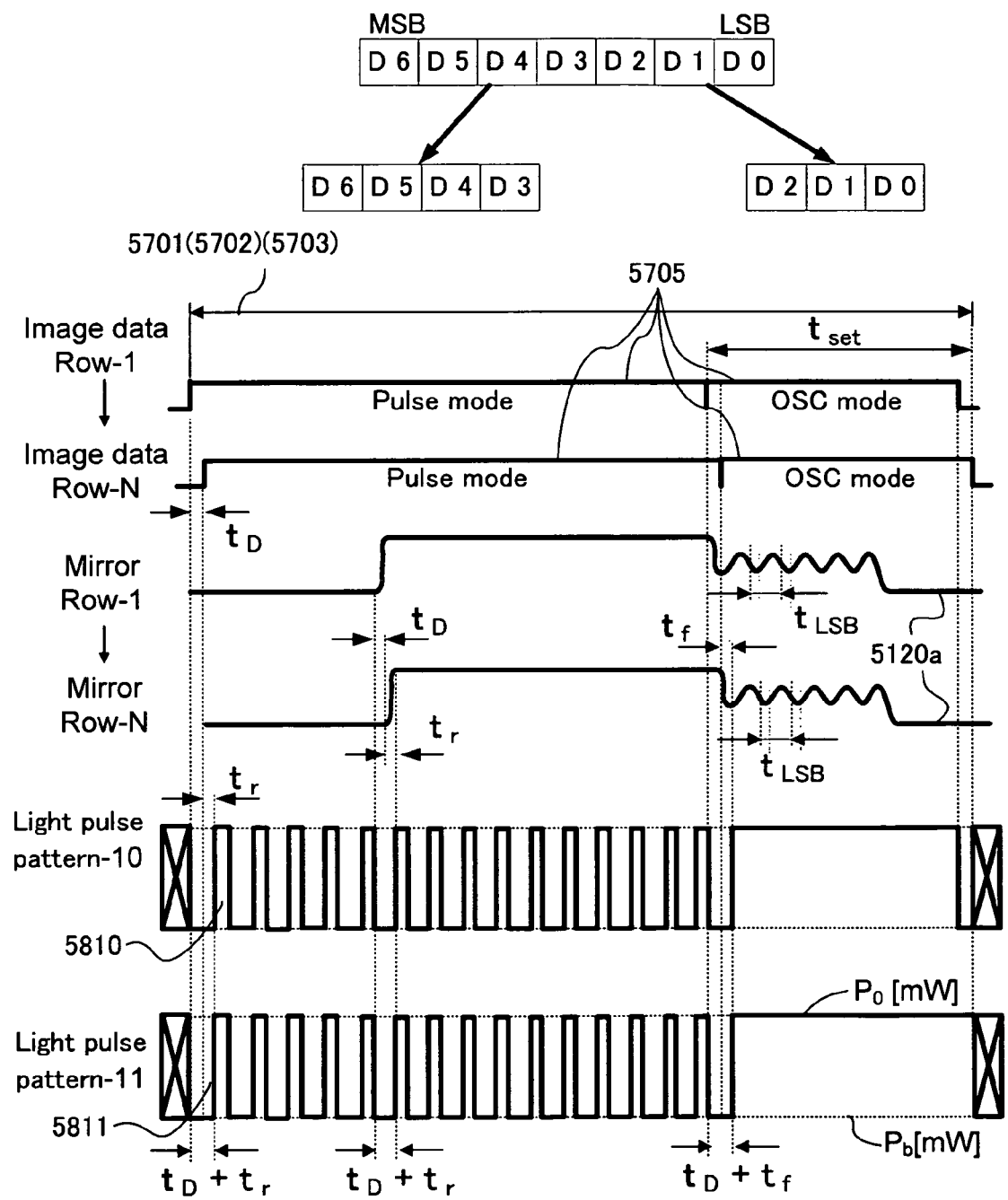
FIG. 24 is a timing diagram for illustrating a modification of the setup of a light source pulse pattern in controlling a mirror using non-binary data in a projection apparatus according to a preferred embodiment of the present invention.

Here follows a description of the control of a spatial light modulator (SLM) using non-binary data, with reference to FIGS. 8, 21, and 24.

In these figures, the SLM controller 5530 controls the spatial light modulator 5100 using non-binarized image data (i.e., non-binary data 5705).

As shown in FIGS. 21 and 24, when a modulation control for the spatial light modulator 5100 is carried out via non-binary data 5705, which has been obtained by converting image data in a binary form into data in a non-binary form, sub-frames that have the same display gray scale are generated because each bit of the non-binary data 5705 has the same weight. When a spatial light modulator is thus controlled, the emission profile of a variable light source 5210 corresponding to sub-frames does not need to be changed for each sub-frame, since the display grayscales are the same for the sub-frames.

The examples shown in FIGS. 21 and 24 illustrate a configuration of assigning the upper four bits (D6 through D3) from the MSB to the ON/OFF control of the mirror 5112 and the lower three bits (D2 through D0) toward the LSB to the oscillation control of the mirror 5112, thereby implementing a gray scale control.

Focusing on one mirror 5112 (i.e., the mirror element 5111), FIG. 21 illustrates turning on and off (i.e., flashing) the variable light source 5210 by means of the ON/OFF control at a predetermined cycle during the ON period of the mirror 5112 (i.e., the mirror modulation control waveform 5120a) in the light source pulse pattern 5807. The start time of an ON/OFF cycle, however, is controlled as to be synchronous with the ON period of a mirror modulation control waveform 5120a by avoiding the rise time $t_r$ of the present mirror modulation control waveform 5120a.

Furthermore, the light source pulse pattern 5807 illustrates the variable light source 5210 as t continuously turned on during 1) the ON period of the mirror modulation control waveform 5120a shifts to the oscillation (OSC) control mode and 2) the period of the oscillation control mode.

As described above, the flashing of the variable light source 5210 during the ON period of the mirror 5112 makes it possible to attain a display gray scale equal or better than that achieved by the ON/OFF control of the mirror 5112.

The light source pulse pattern 5808 illustrates the variable light source 5210 continuously turning on after turning it off once synchronously with the fall time $t_f$ when the mirror modulation control waveform 5120a shifts from the ON state to oscillation state.

With the light source pulse pattern 5808, the column driver 5120 is turned off during a transition from the ON state of the mirror modulation control waveform 5120a to the oscillation state, and, therefore, noise is reduced in the aforementioned transition period.

The light source pulse pattern 5809 illustrates flashing the variable light source 5210 in a predetermined cycle independent of the ON/OFF state or oscillation state of the mirror modulation control waveform 5120a. However, the variable light source 5210 is controlled by the start of the flashing cycle and is turned off during the rise time $t_r$ and fall time $t_f$ of the mirror modulation control waveform 5120a.

This configuration makes it possible to reduce the noise made by the light source during the rise time $t_r$ and fall time $t_f$.

FIG. 24 illustrates how flashing times and the turning on of the variable light source 5210 occur. This is done by taking delay time $t_D$ into consideration, when the aforementioned delay time $t_D$ occurs in timing mirror element 5111, which belongs to a different row of mirror element array 5110, which in the case of controls the spatial light modulator 5100 using non binary data 5705.

The light source pulse pattern 5810 illustrates how the variable light source 5210 is controlled so that it flashes in a predetermined cycle by delaying [delay time $t_D$+rise time $t_r$] and [delay time $t_D$+fall time $t_f$] relative to the ON period of the mirror modulation control waveform 5120a.

Additionally, the light source pulse pattern 5810 makes the end of a turning-off period and the end of the oscillation mode of the first row (Row-1) coincide.

The light source pulse pattern 5811 differs from the above described light source pulse pattern 5810 where the former makes the end of a turning-off and the end of the oscillation mode of the last row (Row-N) coincide; otherwise the patterns are similar.

FIG. 8 illustrates a modification of the control of the spatial light modulator 5100 using non-binary data.

In the light source pulse pattern 5812, the heights of the flashing pulse (that is, the emission intensity) of the variable light source 5210 are changed so as to gradually decrease in the OFF, ON, and oscillation state of the mirror modulation control waveform 5120a.

The variable light source 5210 is controlled by pulses to flash (noted as "flashing pulse" hereinafter) so as 1) to emit light in the emission intensity $P_4$ during, for example, the OFF period of the mirror modulation control waveform 5120a, and 2) to emit light in the emission intensity $P_3$ during the first half of the ON period of the mirror modulation control waveform

5120*a*, 3) to emit light in the emission intensity $P_2$ in the second half of the ON period, and 4) to emit light in the emission intensity $P_1$ during the oscillation period of the mirror modulation control waveform 5120*a*.

Furthermore, the respective turn-on pulse for the emission light intensities $P_4$, $P_3$, $P_2$, and $P_1$ are constituted by the flashing pulse in finer minute cycles.

Controlling the variable light source 5210 by means of the light source pulse pattern 5812 makes it possible to achieve a more delicate display gray scale than the single gray scale display of the spatial light modulator 5100.

Figure 25:
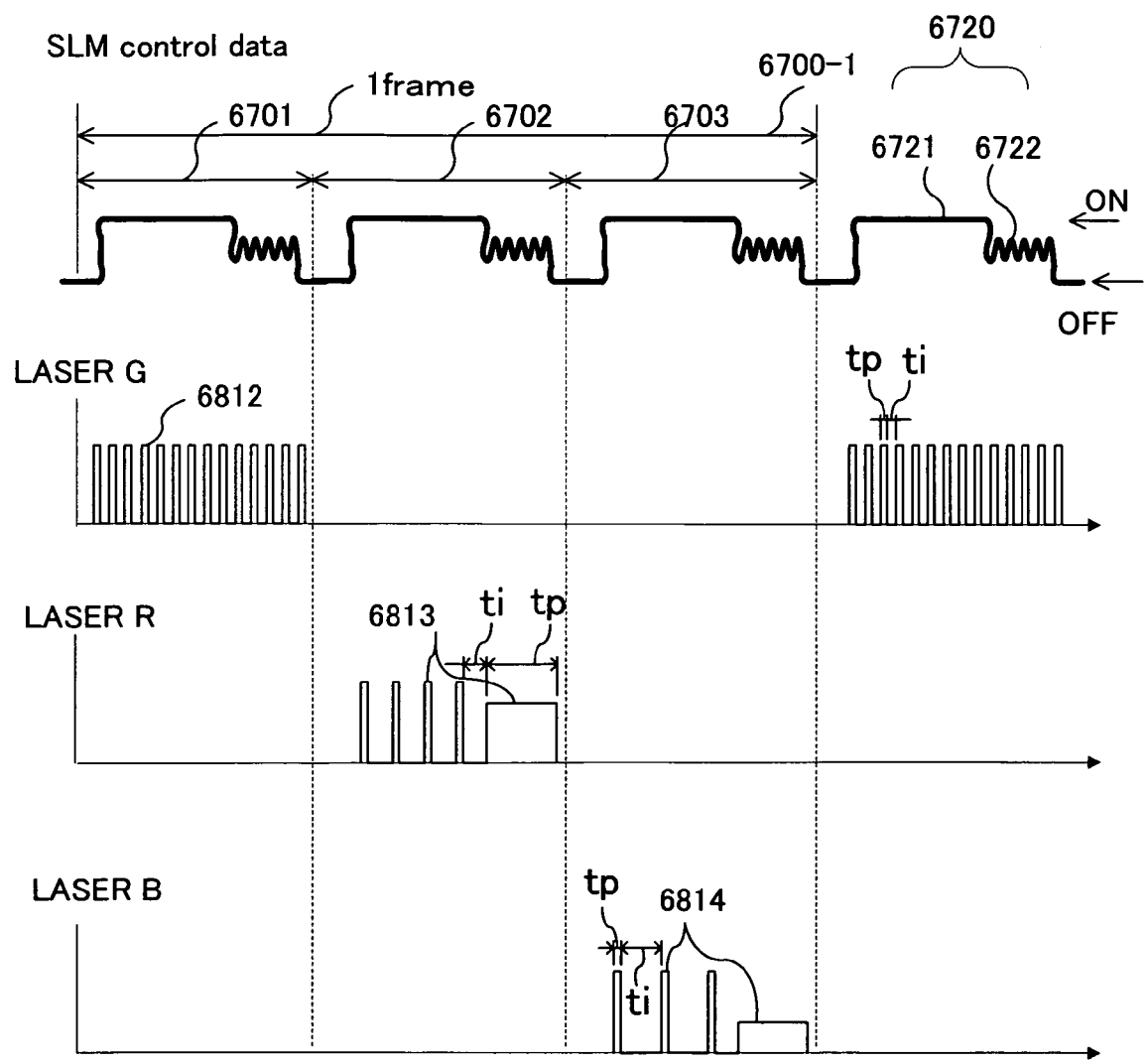
FIG. 25 is a timing diagram for illustrating a control signal of a projection apparatus according to the embodiment of the present invention.

FIG. 25 is a chart illustrating a control for carrying out a color display using the control unit 5505 configured, as illustrated in FIG. 6A, by means of a color sequence method, in a single-panel projection apparatus comprising a single spatial light modulator 5100 as illustrated in the above described FIG. 4.

FIG. 25 shows examples of the wave forms of the light source pulse patterns 5813, 5814, and 5815 of their respective colors, which are generated in the light source control unit 5560 on based on mirror control profile 6720, which is a drive signal output from the SLM controller 5530 to the spatial light modulator 5100, and a video image analysis signal 5800 corresponding to the mirror control profile 6720.

In this case, the mirror control profile 6720 of one frame is comprises the mirror ON/OFF control 6721 at the start of the frame and the mirror oscillation control 6722 at the end of the frame and carries out the tilt control for a mirror 5112 corresponding to the grayscale gradations of the present frame.

The display period of one frame (i.e., a frame 5700*a*) is allocated to subfields 5701, 5702, and 5703 corresponding to their respective colors R, G and B in time series.

Furthermore, the pulse emission of the green (G) laser light source 5212 is controlled in accordance with the light source pulse pattern 5815 in the G subfield 5703, the pulse emission of the red (R) laser light source 5211 is controlled in accordance with the light source pulse pattern 5813 in the R subfield 5701, and the pulse emission of the blue (B) laser light source 5213 is controlled in accordance with the light source pulse pattern 6804 in the B subfield 5702.

As described above, the light source drive circuit 5570 adjusts the emission pulse width tp, emission pulse interval ti, and emission light intensity of the red laser light source 5211, the green laser light source 5212, and the blue laser light source 5213 of the respective colors R, G and B in accordance with the mirror control profile 6720 generated by the SLM controller 5530.

Note that FIG. 25 illustrates the control using non-binary data; a similar adjustment can also be carried out for each laser light source in a control using binary data.

The present embodiment improves the grayscale gradations for the individual colors R, G and B in a color display on a projection apparatus employing a color sequence method.

Here follows an examination of the pulse emission characteristic of the variable light source 5210 for implementing the above-described control according to the present embodiment.

In the multi-panel projection apparatus including the spatial light modulators 5100 for the respective colors and which uses the variable light source 5210 comprising red laser light source 5211, green laser light source 5212, and blue laser light source 5213, as that shown in FIG. 5A, the display period of a sub-frame is corresponding to the least significant bit (LSB) for attaining a 10-bit individual color display grayscale is 16.3 [µsec] (refer to FIG. 19).

Figure 26:
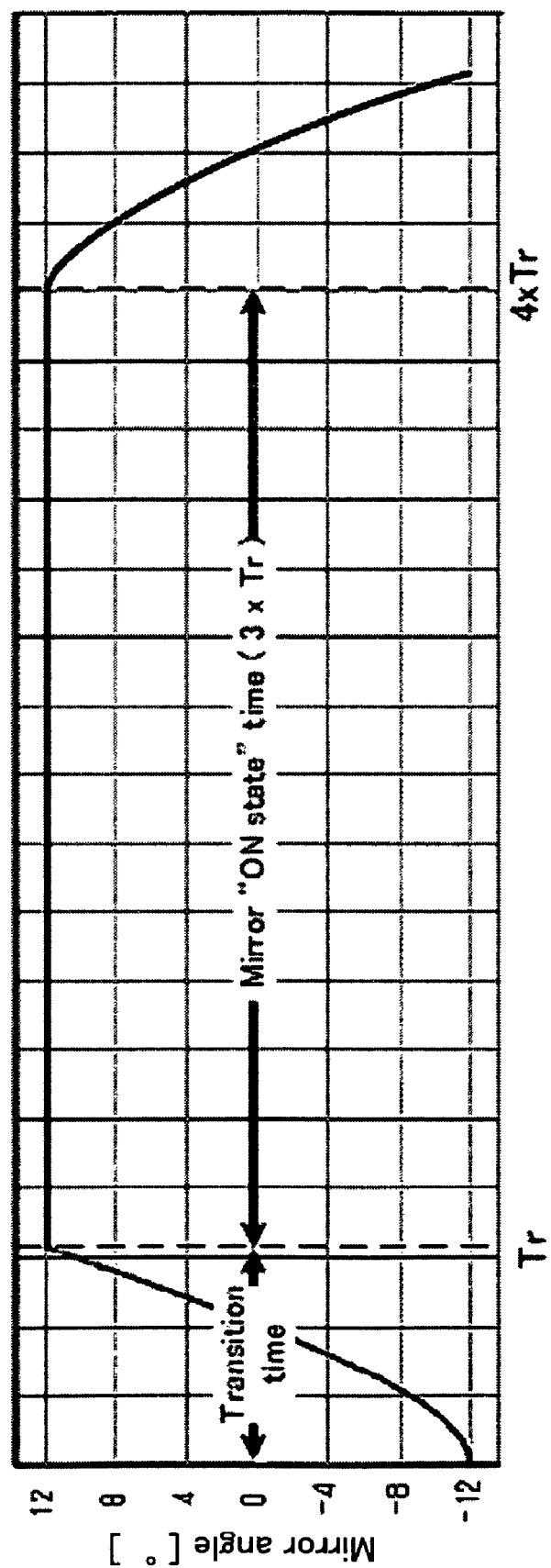
FIG. 26 is a timing diagram for showing the transition time in a pulse width modulation of a mirror of a spatial light modulator according to the present embodiment.

In order to limit the transition period between the individual deflection states of a mirror to no more than the equivalency of ⅕*LSB in a common mirror device, it is necessary to achieve a "LSB display period"=4*$t_r$ (where $t_r$ is a rise time) as shown in FIG. 26, requiring the transition time of the mirror 5112 be limited to no more than 4.1 [µsec].

Even with a mirror device that is capable of attaining such a characteristic, the light source pulse pattern 5801 (i.e., the light pulse pattern-1) according to the present embodiment illustrated in FIG. 20, is not achievable if a long period of time is required for the emission state of the variable light source 5210 to stabilize.

In order to achieve the light source pulse pattern 5801, no less than 50% of the period, in which the light source control unit 5560 causes the variable light source 5210 to emit light, must be operated in a normal state.

More specifically, the variable light source 5210 and the light source control unit 5560 must at least be capable of a pulse emission where the pulse width is no more than 12.2 [µsec], which is the "LSB display period" minus the rise time $t_r$, and no less than 50% of the pulse width is the normal state.

Note that the normal state is defined as the state in which the illumination light emitted from the variable light source 5210 maintains a certain level of emission light intensity, that is, a state in which the emission intensity of the illumination light does not fluctuate (as when it fluctuates at the start and end of emission).

The following describes a similar examination of the single-panel projection apparatus according to the present embodiment as illustrated in FIG. 4.

In the projection apparatus 5010 using R, G, and B variable light sources and a single spatial light modulator 5100, as shown in FIG. 4, the display period of a sub-frame corresponding to the least significant bit (LSB) to achieve a 10-bit individual color display grayscale is 5.43 [µsec] (refer to FIG. 19).

In order to limit transition period between the individual deflection states of the mirror 5112 to no more than ⅕*LSB in a common mirror device, it is necessary that the "LSB display period"=4*$t_r$ (where $t_r$ is a rise time) as shown in FIG. 26, which requires the transition time of the mirror 5112 be limited to no more than 1.36 [µsec].

In this case, the variable light source 5210 and light source control unit 5560 must at least be capable of performing pulse emission in which the pulse width is no more than 4.07 [µsec] and in which no less than 50% of the pulse width is the normal state in order to attain a pulse emission such as the light source pulse pattern 5801 (i.e., the light pulse pattern-1) according to the present embodiment shown in FIG. 20.

Here follows the reasons that the shift angles in the respective deflection state and the shift angles between the individual deflection states both must be set at no higher than ±8 degrees, as described above, for the mirror 5112 of the spatial light modulator 5100 as the present embodiment is configured.

As described above, the present embodiment allows a use of, for example, a semiconductor laser for the red laser light source 5211, the green laser light source 5212, and the blue laser light source 5213, as the variable light source 5210.

When a mirror device as described above is used as the spatial light modulator 5100 for a projection apparatus such as the above described projection apparatuses 5010, 5020, 5030 and 5040, and if a semiconductor laser is selected for the variable light source 5210 as described above, the characteristics of a semiconductor laser enable a smaller angle to be used as the deflection angle of the mirror 5112 for obtaining a desired contrast, as shown in FIGS. 15 and 16, than a common light source, such as a high pressure mercury lamp, in.

As a result, the structural size of the spatial light modulator 5100, comprising a mirror device and, the distance between the mirror 5112 and the address electrodes, such as the ON electrode 5115 and the OFF electrode 5116, can be reduced. Consequently, the Coulomb force for maintaining or changing the deflection state(s) of the mirror 5112 is reduced in proportion to the second power of the distance between the mirror 5112 and the address electrode. This reduction makes it possible to apply a sufficient voltage 1) to the address electrodes, such as the ON electrode 5115 and OFF electrode 5116, and 2) to control the mirror 5112 by taking advantage of a larger Coulomb force, thereby shortening the mirror transition time, such as rise time $t_r$ and fall time $t_f$, which are noted in FIG. 14.

As described above, the present embodiment is configured to change the emission profiles of the variable light source 5210 so as to reduce the mirror transition periods, such as rise time $t_r$ and fall time $t_f$.

If the variable light source 5210 produces no emission of light or a reduced emission intensity level, for example, the light source pulse patterns 5801 through 5803 (i.e. the light pulse patterns 1 through 3), which are exemplified in FIG. 20, during the transition period of the mirror 5112, the light intensity obtained in one frame period (or a light intensity obtained by an entire "white" display) will be reduced (i.e., lost) by the length of the transition period of the mirror 5112.

Therefore, decreasing the deflection angle of the mirror 5112 as in the present embodiment reduces a loss of the light intensity obtained in one frame period and therefore achieves high light-usage efficiency and high accuracy and gradation image display.

Furthermore, the present embodiment reduces the tilt angle of the mirror to no more than ±8 degrees, thereby reducing the difference in potentials (noted as "potential difference" hereafter) to be applied between the mirror 5112 and the address electrodes (i.e., the ON electrode 5115 and OFF electrode 5116) for starting up and driving the mirror 5112 of the spatial light modulator 5100 to deflection states to no higher than 5 volts, and more desirably, no higher than 3.3 volts.

More specifically, since the above-described relationship exists between the voltage, which is to be applied between the mirror 5112 and the address electrodes, and the deflection angles of the mirror 5112 between the deflection states in the spatial light modulator 5100, the spatial light modulator 5100, which is thus enabled for a low-voltage drive, attains a high light-usage efficiency, high accuracy, high-grade gradation image display.

Furthermore, the reduction in size of the mirror 5112 and, accordingly, that of mirror array 5110 are accompanied with the capability of driving the mirror 5112 with a lower applied voltage.

Note that the mirror pitch, mirror gap, deflection angle, and drive voltage of the mirror device according to the present embodiment are not limited to the values illustrated in the above description, and it is preferred that they be within the following ranges: the mirror pitch between 4 μm and 10 μm; the mirror gap between 0.15 μm and 0.55 μm; the deflection angle between 2 degrees and 14 degrees; and the drive voltage between 3 volts and 15 volts.

The present invention may be changed in various ways within this scope and in lieu of being limited to the configurations put forth in the above-described embodiments.

What is claimed is:

1. A projection apparatus using a spatial light modulator (SLM), comprising:
   a variable light source;
   at least one spatial light modulator for modulating an illumination light emitted from the variable light source in accordance with the modulation state of arrayed pixel elements;
   a variable light source controller for controlling modulation of the variable light source; and
   a spatial light modulator controller for controlling modulation of each pixel element of the spatial light modulator, wherein the variable light source controller controls the variable light source for emitting the illumination light as pulse emissions in a pulse width less than or equal to 12.2 microseconds, wherein the variable light source is controlled to operate at a normal state in at least 50% of the emission pulses for emitting the illumination light at a predefined normal emission intensity.

2. The projection apparatus according to claim 1, wherein: the variable light source controller further controls the variable light to operate in a non-emission state during a period when at least one of the pixel elements is in operated in a transition state.

3. The projection apparatus according to claim 1, wherein: the variable light source controller changes the emission states of the variable light source during a period when the pixel element is maintained at a fixed modulation state to correct a loss in brightness due to the pixel element is previously controlled to operate in transition state.

4. The projection apparatus according to claim 3, wherein: the variable light source controller changes the emission intensities of the variable light source during a period when the pixel element is maintained at a fixed modulation state.

5. The projection apparatus according to claim 3, wherein: the variable light source controller controls the variable light source to emit the illumination light to superimpose a predetermined emission pulse on the illumination light projected from variable light source during a period when the pixel element is maintained at a fixed modulation state.

6. The projection apparatus according to claim 1, wherein: the variable light source controller controls the variable light source during a period when the pixel element is operated in a transition state for correcting a loss in brightness, the loss occurring during a previously period when the pixel element is operated in a transition state.

7. The projection apparatus according to claim 1, wherein: the variable light source is controlled by the variable light source controller for emitting the illumination light as the pulse emission having a pulse width smaller than or equal to a period of controlling the pixel element to operate in transition state.

8. The projection apparatus according to claim 1, wherein: the variable light source is controlled by the variable light source controller for emitting the illumination light as the pulse emission having a pulse width smaller than or equal to a period of controlling the pixel element to operate in a transition state.

9. The projection apparatus according to claim 1, wherein: the pixel element further comprises a micromirror and at least one electrode for controlling the micromirror, and the spatial light modulator controller controls and deflects the micromirror for reflecting the illumination light emitted from the variable light source in accordance with a deflection state the micromirror.

10. A projection apparatus using a spatial light modulator (SLM), comprising:
- a variable light source;
- at least one spatial light modulator for modulating an illumination light emitted from the variable light source in accordance with the modulation state of arrayed pixel elements;
- a variable light source controller for controlling modulation of the variable light source; and
- the variable light source is controlled by the variable light source controller for emitting the illumination light as pulse emissions in a pulse width no more than 4.07 microseconds wherein the variable light source is controlled to operate at a normal state in at least 50% of the emission pulses for emitting the illumination light at a predefined normal emission intensity.

11. The projection apparatus according to claim 1, wherein:
the spatial light modulator controller converts at least a part of an input image signal corresponding to the pixel element into non-binary data and controls the pixel element in accordance with the non-binary data.

12. The projection apparatus according to claim 1, wherein:
the pixel element further comprises a micromirror and at least one electrode for controlling the micromirror, and
the spatial light modulator controller controls and deflects the micromirror for reflecting the illumination light emitted from the variable light source in accordance with a deflection state the micromirror.

13. The projection apparatus according to claim 12, wherein:
the micromirror is controlled to deflect between a minimum and maximum deflection angle having an angular range no larger than 16 degrees.

14. The projection apparatus according to claim 10, wherein:
the variable light source controller further controls the variable light to operate in a non-emission state during a period when at least one of the pixel elements is in operated in a transition state.

15. The projection apparatus according to claim 10, wherein:
the variable light source controller changes the emission states of the variable light source during a period when the pixel element is maintained at a fixed modulation state to correct a loss in brightness due to the pixel element is previously controlled to operate in transition state.

16. The projection apparatus according to claim 15, wherein:
the variable light source controller changes the emission intensities of the variable light source during a period when the pixel element is maintained at a fixed modulation state.

17. The projection apparatus according to claim 15, wherein:
the variable light source controller controls the variable light source to emit the illumination light to superimpose a predetermined emission pulse on the illumination light projected from variable light source during a period when the pixel element is maintained at a fixed modulation state.

18. The projection apparatus according to claim 10, wherein:
the variable light source controller controls the variable light source during a period when the pixel element is operated in a transition state for correcting a loss in brightness, the loss occurring during a previously period-when the pixel element is operated in a transition state.

19. The projection apparatus according to claim 10, wherein:
the spatial light modulator controller converts at least a part of an input image signal corresponding to the pixel element into non-binary data and controls the pixel element in accordance with the non-binary data.

* * * * *